United States Patent
Salimi Jazi

(10) Patent No.: US 11,457,075 B2
(45) Date of Patent: Sep. 27, 2022

(54) AUTHORIZATION AND CONTENT MANAGEMENT IN AUTHORIZED PROFILES BASED ON ASSOCIATED STANDARDIZED HIERARCHICAL IDENTIFICATION

(71) Applicant: Farzad Salimi Jazi, San Jose, CA (US)

(72) Inventor: Farzad Salimi Jazi, San Jose, CA (US)

( * ) Notice: Subject to any disclaimer, the term of this patent is extended or adjusted under 35 U.S.C. 154(b) by 0 days.

(21) Appl. No.: 17/100,940

(22) Filed: Nov. 22, 2020

(65) Prior Publication Data
US 2021/0160339 A1  May 27, 2021

Related U.S. Application Data

(60) Provisional application No. 62/938,337, filed on Nov. 21, 2019.

(51) Int. Cl.
| | | |
|---|---|---|
| *H04L 67/303* | (2022.01) | |
| *H04L 9/40* | (2022.01) | |
| *H04L 67/51* | (2022.01) | |

(52) U.S. Cl.
CPC .......... *H04L 67/303* (2013.01); *H04L 63/10* (2013.01); *H04L 67/51* (2022.05)

(58) Field of Classification Search
CPC ....... H04L 67/303; H04L 63/10; H04L 67/16; H04L 61/2007; H04L 61/6004; H04L 63/102
See application file for complete search history.

(56) References Cited

U.S. PATENT DOCUMENTS

| | | | | |
|---|---|---|---|---|
| 7,193,974 | B2 * | 3/2007 | Eatough | H04L 12/185 370/254 |
| 8,984,149 | B1 * | 3/2015 | Martini | H04L 41/0893 709/228 |
| 2008/0133716 | A1 * | 6/2008 | Rao | H04W 4/08 709/220 |
| 2014/0019542 | A1 * | 1/2014 | Rao | G06Q 30/0269 709/204 |
| 2014/0181274 | A1 * | 6/2014 | Bazin | H04L 61/2015 709/220 |
| 2014/0330833 | A1 * | 11/2014 | Miyazaki | G06F 16/285 707/740 |
| 2018/0343317 | A1 * | 11/2018 | Lakunishok | H04L 43/16 |

(Continued)

*Primary Examiner* — David R Lazaro
(74) *Attorney, Agent, or Firm* — Makoui Law, PC; Ali Makoui

(57) ABSTRACT

A method of accessing and managing content in a network based on unique standardized hierarchal identifications. A request is received from a first electronic device to access the network. The device is associated with a unique identification comprising a plurality of hierarchal sections, each section identifying a hierarchal subsection of the network. A set of profiles are assigned to the device, each profile associated with one of the hierarchal subsections, the profile associated with the lowest level in the hierarchy associated with the device and other profiles in the set associated with the hierarchical levels of the network. A set of profiles of other devices is displayed on the device. The identification of each device in the set is associated with at least one hierarchal section of the first device identification. Messages received from the first device to another electronic device in the set are sent to the other device.

18 Claims, 35 Drawing Sheets

(56) References Cited

U.S. PATENT DOCUMENTS

| | | | |
|---|---|---|---|
| 2019/0347302 A1* | 11/2019 | Walters | G06F 16/9024 |
| 2020/0067819 A1* | 2/2020 | Basavaraj | H04L 61/2007 |
| 2020/0382527 A1* | 12/2020 | Mitelman | G06F 16/9038 |
| 2021/0160339 A1* | 5/2021 | Salimi Jazi | H04L 67/303 |

* cited by examiner

```
traceroute to google.com (216.58.194.174), 64 hops max, 52 byte packets
 1  192.168.0.1 (192.168.0.1)  2.073 ms  0.936 ms  0.910 ms
 2  96.120.91.105 (96.120.91.105)  14.210 ms  9.804 ms  11.340 ms
 3  24.124.158.217 (24.124.158.217)  9.343 ms  13.976 ms  74.148 ms
 4  be-331-car01.hayward.ca.sfba.comcast.net (162.151.79.153)  16.039 ms  11.097 ms  10.863 ms
 5  be-399-ar01.hayward.ca.sfba.comcast.net (68.86.143.89)  12.966 ms  14.108 ms  19.678 ms
 6  69.241.91.94 (69.241.91.94)  13.410 ms
    96.112.140.10 (96.112.140.10)  15.194 ms  14.208 ms
 7  10.252.214.254 (10.252.214.254)  10.485 ms
    10.252.62.126 (10.252.62.126)  11.447 ms
    10.252.71.158 (10.252.71.158)  10.849 ms
 8  72.14.235.0 (72.14.235.0)  12.965 ms
    74.125.252.158 (74.125.252.158)  14.845 ms
    209.85.248.34 (209.85.248.34)  14.686 ms
 9  108.170.243.237 (108.170.243.237)  13.095 ms
    108.170.243.14 (108.170.243.14)  22.739 ms
    108.170.237.21 (108.170.237.21)  20.273 ms
10  74.125.253.149 (74.125.253.149)  17.237 ms  22.892 ms
```

| Hash ID | Plain IP information | Profile Data pointer |
|---|---|---|
| 327372823321378332yn | 192.168.0.5 | P1 |
| 327yryryr372837832vi | 107.3.1.10/24 > 10.1.1.1/24 | P2 |

| Hash ID | Plain IP information | Profile Data pointer |
|---|---|---|
| Airport_LAX_TERMINAL_1 | 192.168.0.5 | P1 |
| UNIVERSITY_U_DEPARTMENT_X | 107.3.1.10/24 > 10.1.1.1/24 | P2 |

AUTHORIZATION AND CONTENT MANAGEMENT IN AUTHORIZED PROFILES BASED ON ASSOCIATED STANDARDIZED HIERARCHICAL IDENTIFICATION

CLAIM OF BENEFIT TO PRIOR APPLICATIONS

This application claims the benefit of U.S. Provisional Patent Application Ser. No. 62/938,337, filed on Nov. 21, 2019. The contents of U.S. Provisional Patent Application No. 62/938,337 are hereby incorporated by reference.

BACKGROUND

Devices and apparatus such as computers, mobile devices, smart phones and IoT (Internet of Things) devices with a network interface, need an identifier or a label associated to their network interface in order to operate and communicate in a computer network which uses Internet Protocol (IP) for communication.

A computer network is a set of devices connected, allowing sharing of resources and exchange of data. An IP address is an identifier assigned to the network interface of a device in a computer network. An IP address assigned to a device or interface is unique within its operating network. An IP may be assigned to only one device in its operating network. If multiple devices in a network receive the same IP, this will result in IP conflict and the devices encountering an IP conflict will not be able to communicate in the network.

Any network interface may obtain one IP address at a time. IP addresses assigned to network interfaces may be dynamic and static. A static IP would remain static and stick to an interface as long as the network interface operates in the network while dynamic IP are released and reassigned dynamically and have an expiry.

Dynamic IP addresses is assigned to a network interface by a Dynamic Host Communication Protocol or similar protocols operating in a network. These dynamic IP assignments are a lease and have an expiry. After expiration the IP is released or reassigned to another interface in the network. At any point of time, the network interface of a device needs an IP address to maintain connectivity and communication in its network.

Users of mobile devices, smart phones, mobile IoT devices and laptops might move from one network to another network multiple times during a day. In this scenario the device obtains different IPs across these networks to stay connected to world wide web or the network.

Network interfaces of portable devices may obtain different IP addresses with different expiration from time to time dynamically.

An IP address (IPv4 or IPv6) may be assigned to an interface on a specified period of time and released after the expiration. An IPv4 is a quadripartite dot separated number, each part within 0-255 (i.e., 192.168.2.2). An IPv6 is a six-partite hexadecimal colon separated number (i.e., 46:44:03:48:dd:e4).

An IP address may be assigned to and released from network interfaces during its lifetime in a network. An IP address for example 192.168.2.2 may be assigned to device A that enters the network on Sunday, September 22, at 10:10:00 PM and be released or expired on Sunday, September 22, at 10:18:00 PM (either expired by the protocols that is responsible for reassigning of IP address or upon device A leaving the network).

After the release of IP 192.168.2.2, device B may enter the network and obtain the IP for another period of time.

There are organizations, tools and multiple source for providing information about an assigned IP because they obey a standard and they are involved in IP assignment. Some of these organizations are introduced bellow.

The Internet Corporation for Assigned Names and Numbers (ICANN) is an organization responsible for coordinating the maintenance and procedures of several databases related to the namespaces and numerical spaces of the Internet. ICANN performs the actual technical maintenance work of the Central Internet Address pools and DNS root zone registries pursuant to the Internet Assigned Numbers Authority (IANA) function contract.

The Internet Assigned Numbers Authority (IANA) is a standards organization that oversees global IP address allocation, autonomous system number allocation, root zone management in the Domain Name System (DNS), media types, and other Internet Protocol-related symbols and Internet numbers.

The IP address space is managed globally by the Internet Assigned Numbers Authority (IANA), and by five regional Internet registries (RIRs) responsible in their designated territories for assignment to local Internet registries, such as Internet service providers (ISPs), and other end users. IPv4 addresses were distributed by IANA to the RIRs in blocks of approximately 16.8 million addresses each.

WHOIS (pronounced as the phrase "who is") is a query and response protocol that is widely used for querying databases that store the registered users or assignees of an Internet resource, such as a domain name, an IP address block or an autonomous system, but is also used for a wider range of other information. The protocol stores and delivers database content in a human-readable format.

BRIEF DESCRIPTION OF THE DRAWINGS

The various embodiments of the present the novel and non-obvious method of authorization into profiles based on associated unique standardized hierarchal Identification and content management in authorized profiles as a communication and social networking embodiment now will be discussed in detail with an emphasis on highlighting the advantageous features. These drawings include the following figures, in which like numerals indicate like parts:

FIG. 15 illustrates a sample output for Traceroute a network tool used to determine the "path" packets take from one IP address to another on "device A" in FIG. 17, according to prior art;

FIG. 22 is a schematic front view of a computing device that may include an application program for each IP profile illustrate temporary ownership of IP profile and passing ownership to different users when IP is given to different users, according to various aspects of the present disclosure;

DETAILED DESCRIPTION

Figure 1:
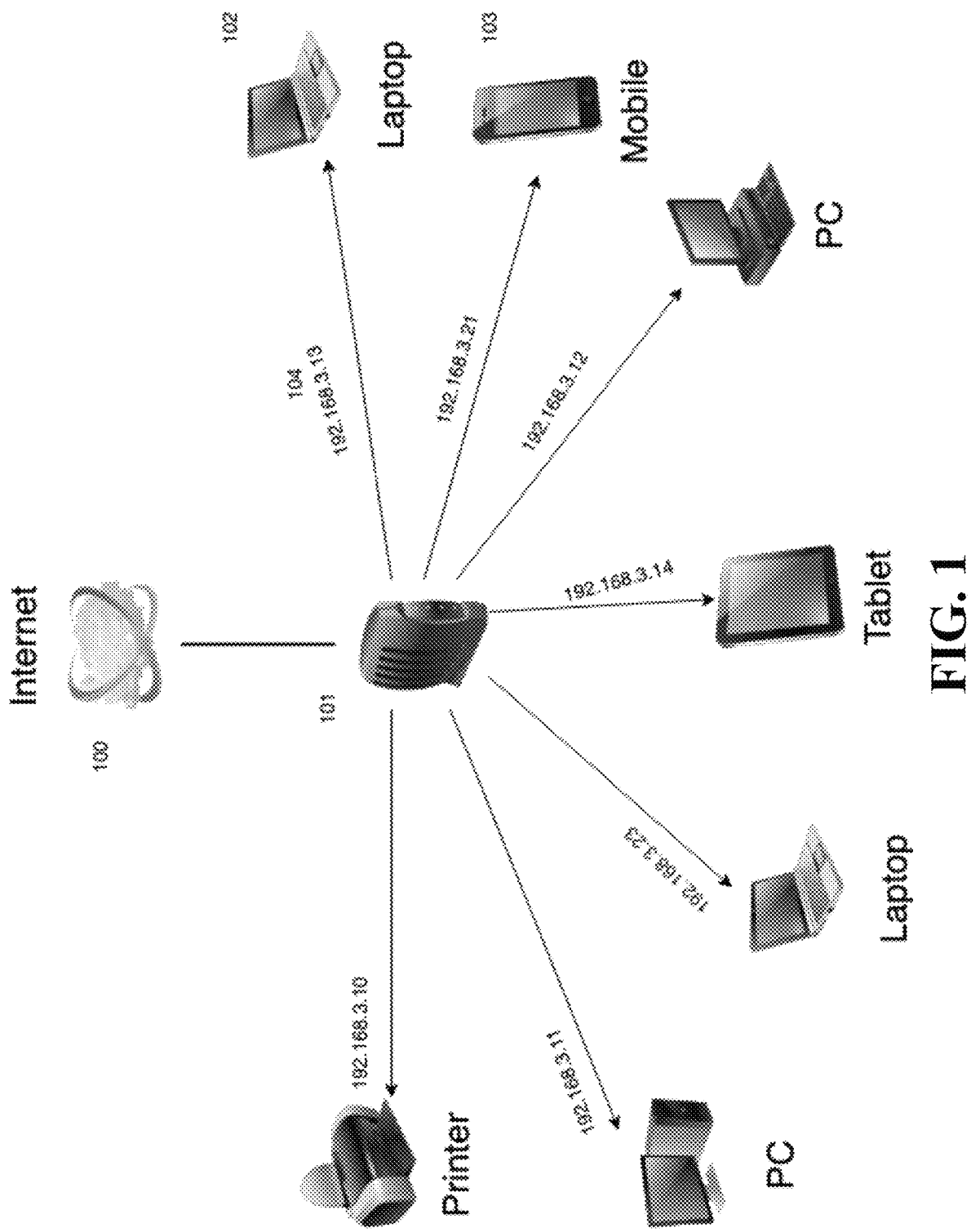
FIG. 1 is a simple representation of communication and connectivity on the internet (World Wide Web), according to prior art.

In the first section, the embodiments depict the novel and non-obvious method of authorization into profiles based on related Internet protocol addresses associated with device shown in the accompanying drawings, which are for illustrative purposes only.

In the second section, the embodiments depict the novel and non-obvious method of authorization into profiles based on related standardized public identification associated with products and content management in authorized profiles as a communication and social networking embodiment shown in the accompanying drawings, which are for illustrative purposes only.

In the third section, the embodiments depict the novel and non-obvious method of authorization into profiles based on related geolocation data associated with device and content management in authorized profiles as a communication and social networking embodiment shown in the accompanying drawings, which are for illustrative purposes only.

In the fourth section, an example of computer system of some embodiments is described.

I. Method of Authorization into Profiles Based on Related Internet Protocol Addresses Associated with Device Some embodiments use hierarchal unique standardized identification assigned to device using Internet protocol to auto sign into network of profiles, once the device is connected to internet. The embodiments using the Internet Protocol address (IP address) to auto sign-On (authorization) and method of content management associated to IP profiles is presented as a communication and social networking embodiment. Some embodiments may use other parameters assigned to device once connected to the Internet using Internet protocol, and may refer to this hierarchal unique identification assigned to device as IP or IP address, that is used to transfer data from one device to another device connected to the Internet.

Class Inter-Domain Routing (CIDR) has been a method for allocating IP addresses and routing. A network may be broken down into subnetworks namely subnets and each subnet has defined to use a subset of the IP allocation pool determined with two groups of bits in the IP address. The significant bits identify the subnetwork, whereas least significant bits identify the host or the network interface. The routing between networks is feasible with this classification. In CIDR, an IP address subnet and host may be recognized based on the CIDR mask, and routed accordingly.

The present embodiments provide a method and a system to profile a subnet as a group and all the hosts in the subnet are able to authenticate into their subnet profile. Each user, obtaining an IP from a subnet, may operate and route internally within a subnet. The network interface obtaining an IP address, may authenticate and log-in into the IP profile obtained and also to the subnet profile or gateway profile of its network. A subnet profile has all the functionalities and attributes of an IP profile, but it also has group level attributes and functionalities. A subnet profile has a messaging mechanism, to enable messaging, broadcasting, multi-casting among its IP profiles. IP profiles within a subnet may also choose to be invisible and transparent and assign their IP profiles a persona Identity. Whenever a network interface joins a subnet, it may login to the IP profile and it is recognized as part of the Subnet profile of its underlying subnet. The subnet profile also contains group functionalities such as group alerts, group offerings, one-to-one, one-to-many messaging mechanisms, group promotions, visibility in group settings and group Identity features.

When a network interface leaves a subnet, it releases the IP address to the subnet, but it may leave a trace of its identity or share its identity or visibility to IP profiles of the subnet before leaving and maintain connectivity to them. The embodiment provides a method to connect real Identity Profiles to these IP profiles and real Identity profiles to subnet profiles as an option to enable and disable visibility.

If a network interface A, chooses to be visible in its subnet and share its real Identity profile with network interface B, a connectivity and profile connection between their real Identity profile may be established, and maintained even when both A and B leave their IP profiles or logout of the IP profiles.

Gateway profile of the present embodiments may have a subnet mask, which is a mask that distinguishes the host IPs within the subnet. It has the number of active hosts, expiry of each. It has a group or subnet profile content, which is visible to all the host members of the subnet. It may also contain a message that may be visible to all the host members. The Subnet profile inherits all the attributes and features of an IP profile, and it has also some more functionalities and attributes. A subnet profile provided in the present embodiments also has the number of assigned IPs, the information about who or where this subnet may belong to and a subscription attribute which holds subscription of the Subnet profile to channels, promotions, localities and may receive content from outside and push the content via multicasting within itself.

The present embodiments provide a system and method to multicast the subscription-based content and make this content visible to all active hosts of the subnet at a given time. A method to utilize the Subnet profiles and IP profiles is presented in the present embodiments.

The remaining detailed description describes the present embodiments with reference to the drawings. In the drawings, reference numbers label elements of the present embodiments. These reference numbers are reproduced below in connection with the discussion of the corresponding drawing features.

Some embodiment include creating IP-based profiles and single sign-on methods to access these profiles. Devices connected to networks, obtain an IP-address from the network they are connected to, in order to maintain their connection. This IP address is assigned to one device at a time and they cannot serve multiple machines with the same IP address. This embodiment includes a profile associated with any IP address. IP address X has a profile associated with it and any device that obtains IP address X in its connectivity lifetime may access the content of the IP address profile. Only the device that currently holds IP address X, may have access to the contents of IP profile X. These contents are IP locality promotions, IP address-based contents, messages, profile attributes, and an augmentation functionality which allows the existing signed-in device to add/augment the contents of the current profile Any IP address may belong to a bigger subnet, a range of IPs that are recognized together with a subnet mask. This embodiment includes creating and assigning a profile to subnets. The embodiment suggests creating a data storage of the content and attributes of the subnet profiles. IPs that fall into a subnet may have access to subnet profile contents of their subnet. Subnet profiles store information about locality of subnet, market promotions, group functionalities to broadcast and multicast to their internal IP address profile contents and subnet related attributes, size of subnet, number of IP profiles that exist in the subnet, obtained IP addresses of the subnet, subscription channels that markets may push contents to and IP address profiles may request subnet profiles to receive, multicast, unicast the contents to them.

A simple mechanism to implement the IP profiling is maintaining a database table/collection for IP profiles, that has association information about IP profile, associated IP address, number of times an IP address is obtained, the subnet information of the IP address, time constraints, current status (active if any device has obtained the IP address and inactive if no device has obtained the IP address) and contents associated with IP profiles. Another table/collection to maintain the subnet profiles, and all attributes of a subnet profile and an association to the content and IP addresses and IP profile table/collection.

A simple view of the contents as a mobile or smart application program may reside on devices. Whenever a device obtains an IP, it may open the application and have access to content of the IP profile with an auto-sign-on match of IP address obtained with IP profile database. Smart application that resides on devices sends a request to IP profile/subnet Profile servers and it retrieves the contents, authenticates itself and plot a view of the content to the device user.

FIG. 1 (100) is a simple representation of communication and connectivity on the Internet (World Wide Web). Devices 102 laptops, 103 mobile devices are connected to a router (101) which assigns them an IP address (104) to any member of the network that requests to join the network.

Figure 2:
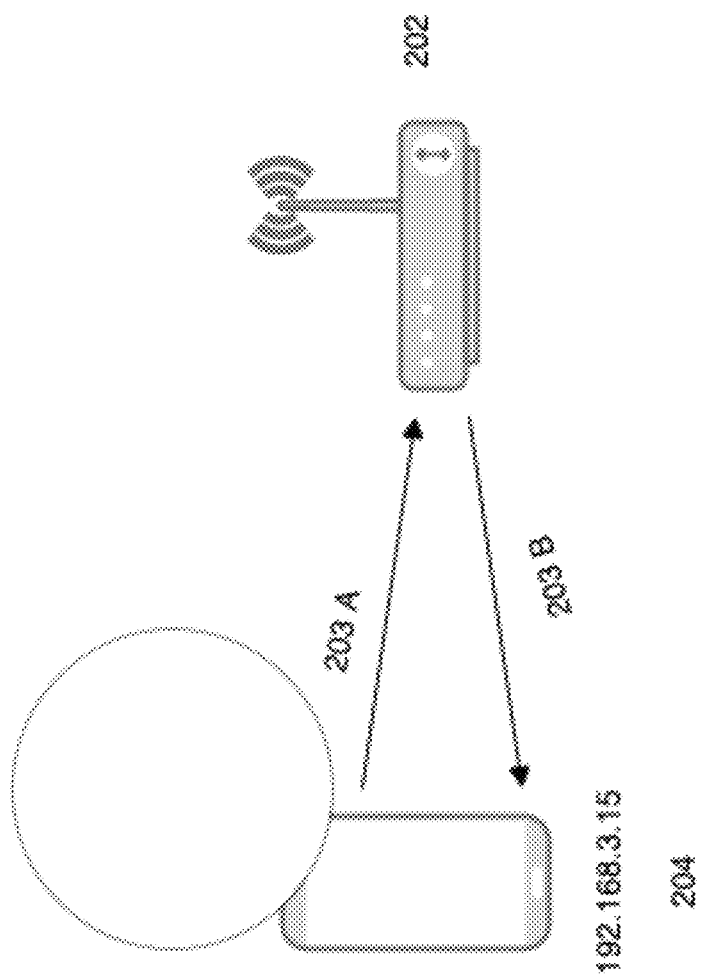
FIG. 2 represents the IP address request and assignment in a network, according to prior art.

FIG. 2 represents the IP address request and assignment in a network. A device/network interface (201) submits a request (203A) to the network router/hub/gateway (202) to join the network. The router (202) validates the request and if approved, it assigns (203) an IP address (204) to the network interface of device (201)

Figure 3:
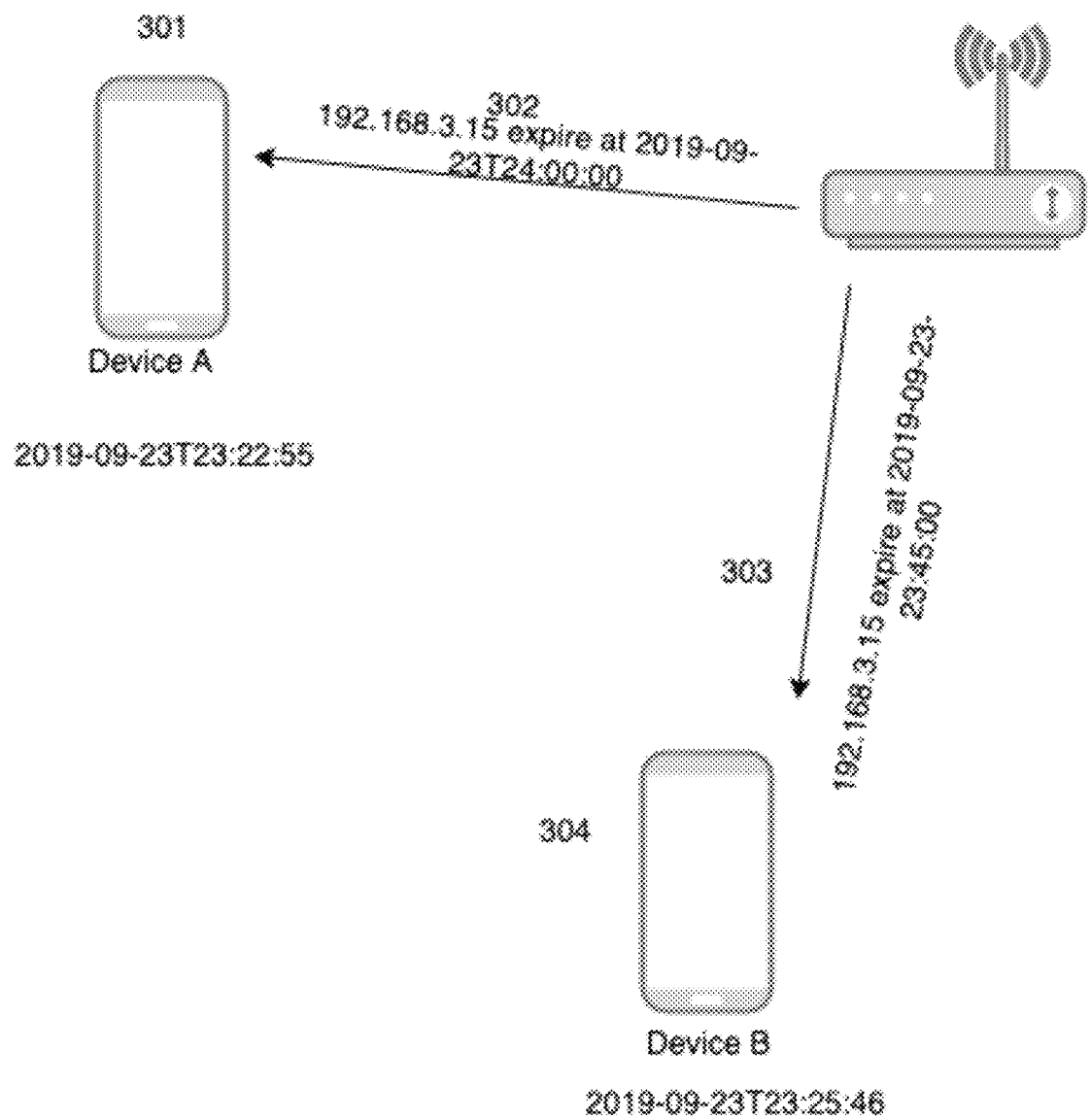
FIG. 3 represents the temporary assignments of IP addresses in a network, according to prior art.

FIG. 3 represents the temporary assignments of IP addresses in a network. An IP address may be assigned to a network interface within an expiration date. In FIG. 3, the network interface of device A (301) requests to enter the network on Monday September 23rd 23:22:55 PM. The router assigns (302) an IP address to the network interface of (301). The IP address in the response (302) has an expiry timestamp and it expires at 23:24 PM, Sep. 23, 2019. The pair (192.168.3.15, 2019-09-23T11:24:00:00) sent over as a response to 301 represents the (IP address, expiry time) pair sent to the network interface. At 11:24, the device A (301) IP address will expire and the device A, needs to resubmit/ extend, or leave the network. At 23:25:46, device B (304) enters the network and requests an IP address to join a network. The router at this point has 192.168.15 address released and expired from device A, thus it reassigns the IP address (303) to device B (304) with a new expiry time at 2019-09-23T23:45:00. FIG. 3 represents the reassignment cycle of an IP address and reuse of an IP address within a network.

Figure 4:
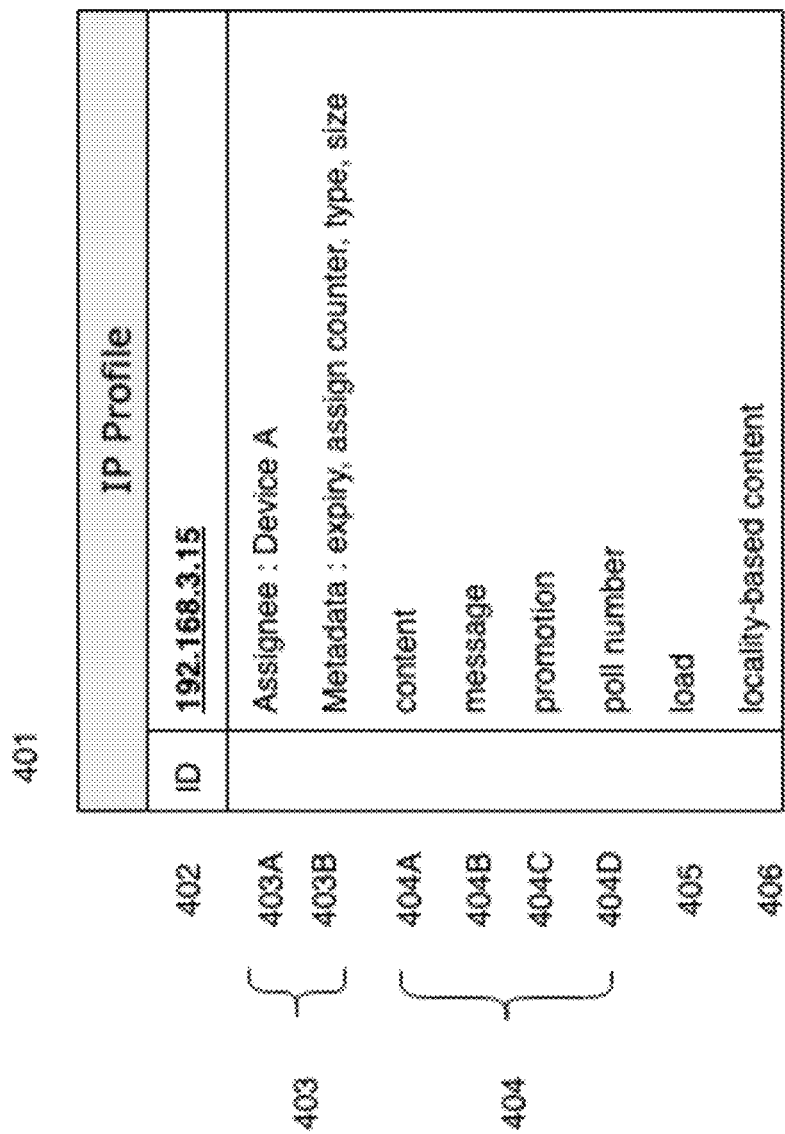
FIG. 4 represents the provided IP profile, according to various aspects of the present disclosure.

FIG. 4 represents the IP profile of the present embodiments. Any IP in the network, has an associated profile. The present embodiments provide a method and a system and apparatus, to record this IP profiles and the mechanism to log in into the IP profile and retrieve its content.

Some of the present embodiments provide an IP profile for any IP containing the information of current assignee of IP in any given time. The figure represents an example profile assigned to IP address 192.168.3.15 (402). The IP profile contains a metadata (403) containing current assignee of IP address (403A). For example, in the figure the current assignee of 192.168.3.15 is Device A. The metadata (403) also contains the expiry, assign counter, type, size and other metadata details associated with this IP profile (403B).

Some of present embodiments also present a content associated with the IP profile (404). The content may have a content payload (404A), a content message (404B), a promotional content (404C) and a random number associated with a profile used for lottery and poll-based operations provided by the present embodiments (404D). The IP profile provided by the present embodiments may be augmented by a load (405) by the current device logged into the IP. The load (405) may be integrated with the content for the next assignment of IP. The IP profile contains a locality-based content (406) that is populated by push notification or subscription notification mechanisms provided by the present embodiments.

Figure 5:
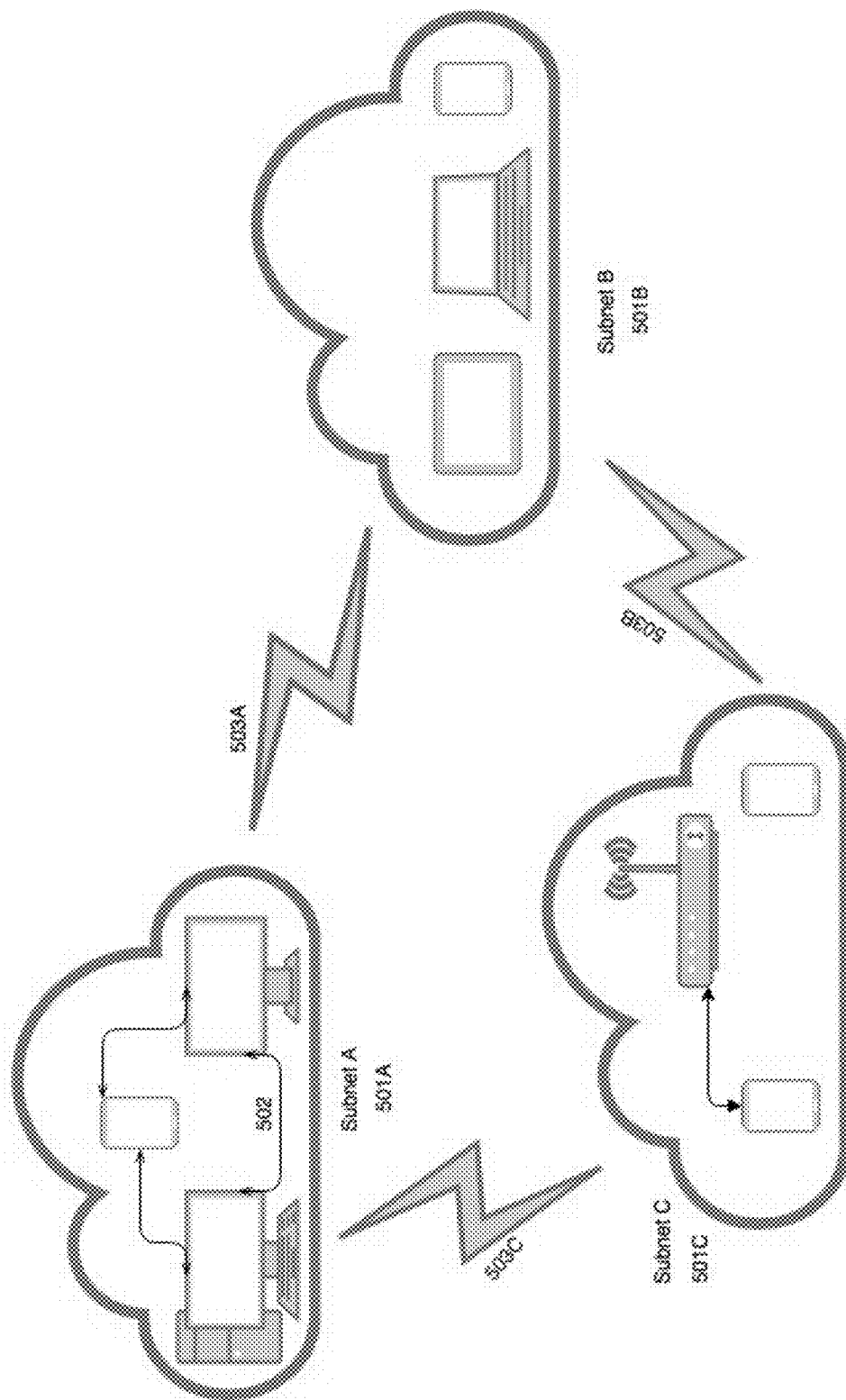
FIG. 5 represents the IP groups, or subnets in a network according to prior art

FIG. 5 represents the IP groups, or subnets in a network. Subnets in the example illustration, subnet A (501A), subnet B (501B), subnet C (501C) each have their own subnet address and subnet mask. A subnet mask defines which range of IP address ranges fall into that subnet. The network interfaces of given subnet may communicate to one another without complicated routing. The communication between subnets (503A, 503B, 503C) needs further routing.

Figure 6:
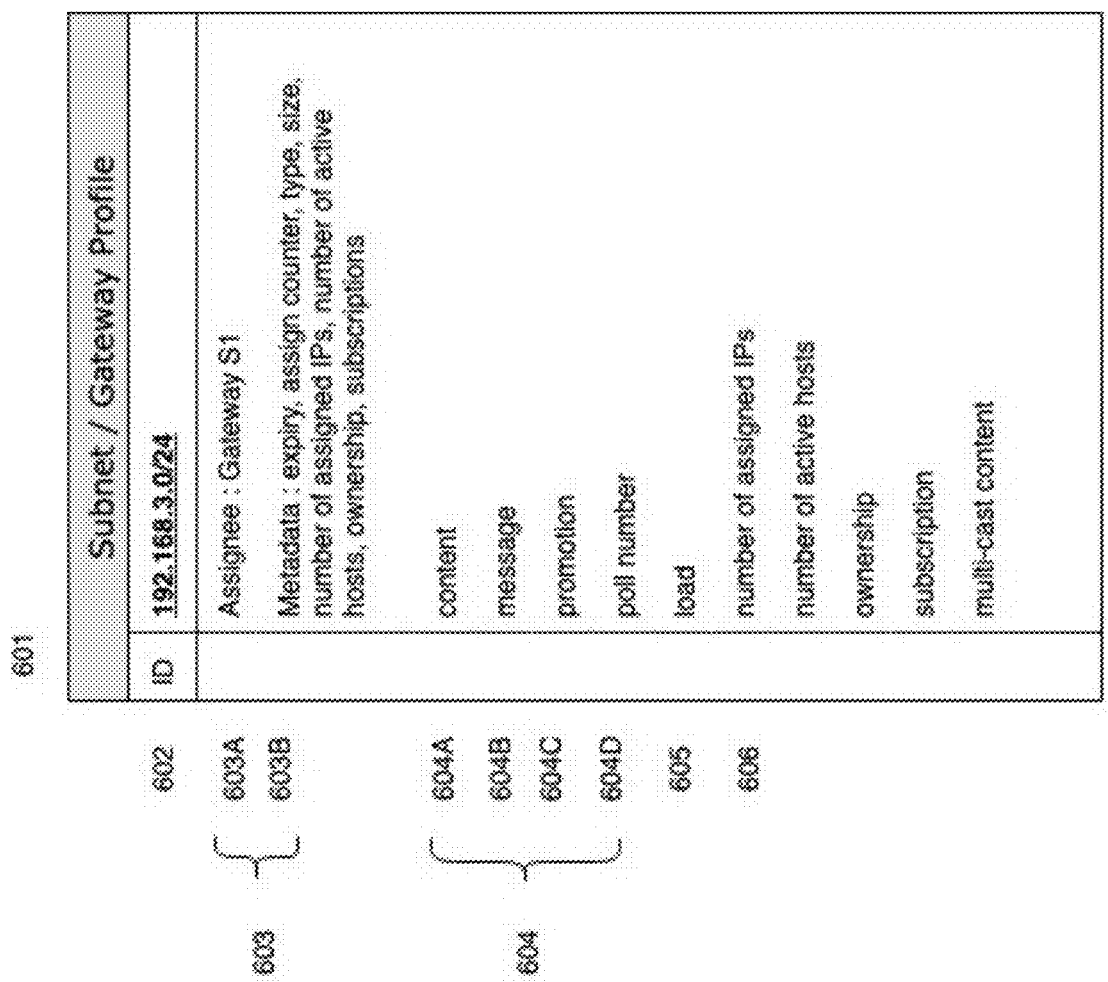
FIG. 6 illustrates the method and system to assign a subnet profile to any given subnet, according to various aspects of the present disclosure.

FIG. 6 presents the present embodiments' method and system to assign a subnet profile to any given subnet. The subnet/gateway profile 601, has a subnet mask or ID associated with the profile (602). The subnet profile is visible to all the network interfaces and hosts that are within that subnet. A subnet profile contains the metadata associated with the subnet profile (603). This metadata contains the assignee of the subnet profile or owner of subnet profile (603A) as an example gateway S1, as well as metadata details containing expiry, size of the subnet, number of assigned IPs within the subnet, number of active hosts within subnet, ownership of the subnet (for example a subnet owner may be an ISP provider or a private company) and the subnet subscription. The subnet subscription is a method provided by the present embodiments to receive promotional data related to the subnet and has a method and system to propagate and release this data to the active hosts of the current subnet.

The subnet profile also has a content (604A) message (604B), promotional content (604C), random number associated to the subnet for lottery or poll-based purposes (604D).

The subnet profile may also be loaded by a content (605) which will be available to the future subnet active hosts in future.

Figure 7:
FIG. 7 illustrates the method and system to enlist the subnets available in vicinity of a device, according to various aspects of the present disclosure.

FIG. 7 illustrates the present embodiments' method and system to enlist (703A,703B,703C,703D) the subnets available in vicinity of a device (702). Each of these subnets, which are valid endpoints that network interface of device (702) may request to join, have a private content, and a public content. Public content (701) may be seen from outside, from the device (702) that requests to join them. The public content may be represented to the device (702) and device may join the one that matches its desirable contents or promotions.

Figure 8:
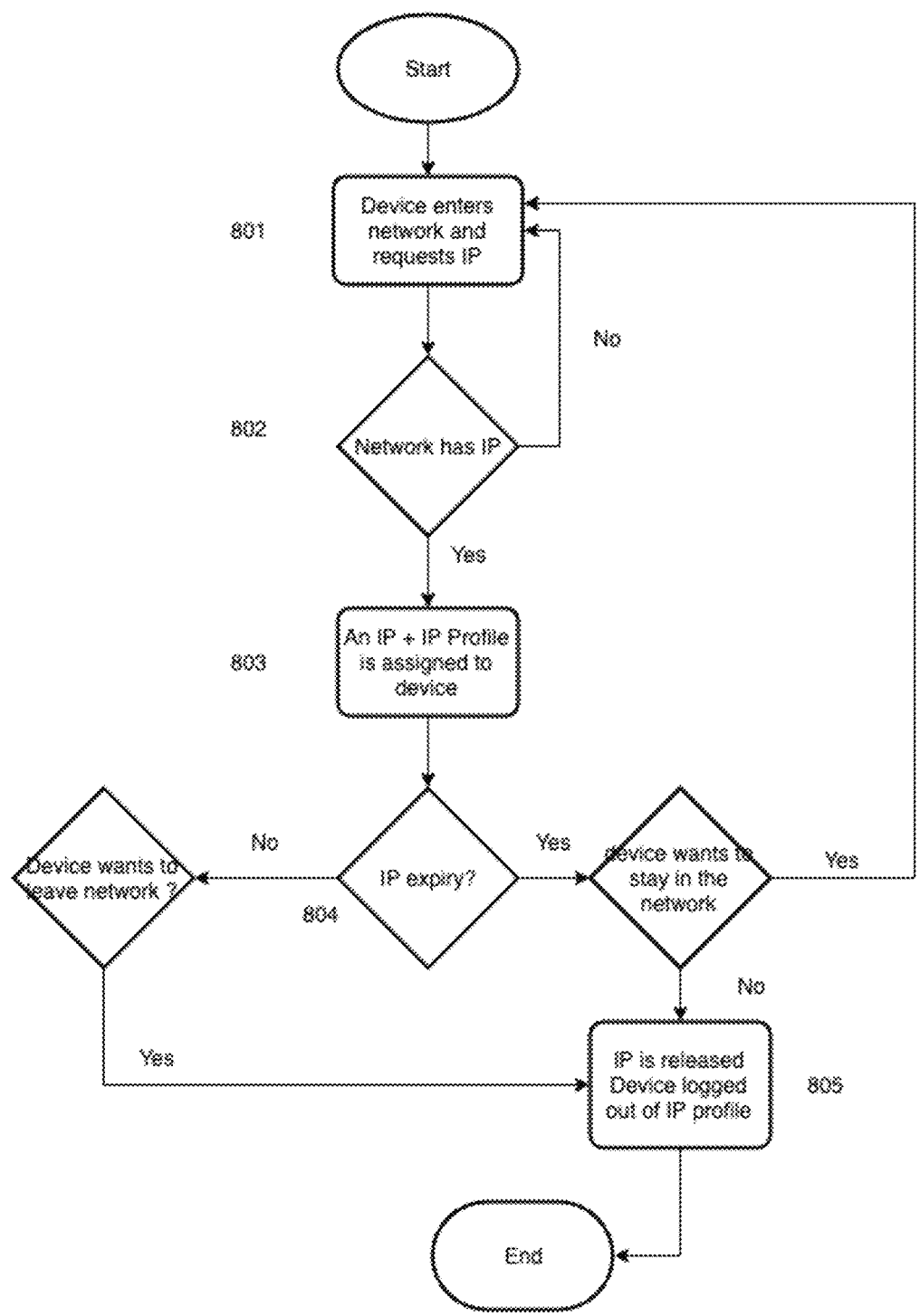
FIG. 8 illustrates the IP obtainment in a network and the method of providing assignment of IP profile to the obtainer parallel to IP obtainment, according to various aspects of the present disclosure.

FIG. 8 illustrates the IP obtainment in a network and how the method provides assignment of IP profile to the obtainer parallel to IP obtainment. 801 the initial step a device discovers and requests a network to obtain an IP and join the network. If network has availability and available IP (802) it assigns the IP address to the device (803). The method of present embodiments provides the IP to be the key to enter the IP profile, hence an IP profile is also assigned to the device (803). If IP is expired (804), IP will be released from device. In case the device wants to stay in the network it needs to go through the same IP request and network enquiry (801) again, otherwise the IP is released (805). The methods of present embodiments provide automatic logout of the device out of IP profile, as the IP is released. The methods of present embodiments provide an exact match of IP address of the device and IP address of the profile to be able to access an IP profile content (805).

Figure 9:
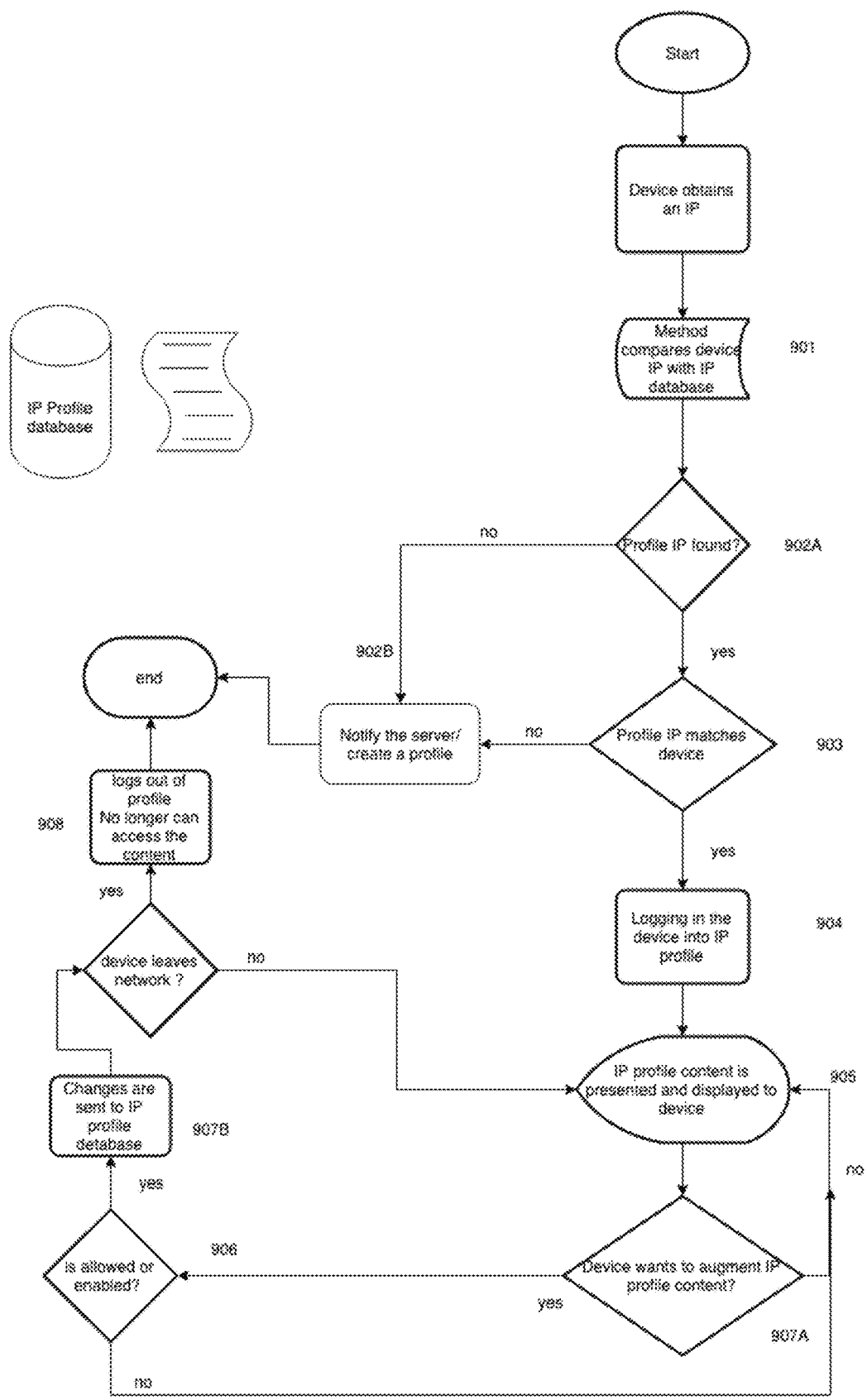
FIG. 9 illustrates how the IP profile assignment, release, creation is structured, according to various aspects of the present disclosure.

FIG. 9 illustrates how IP profile assignment, release, creation is structured in the present embodiments. When the device obtains an IP address, it may send a request to the application of the present embodiments and the application compares the device IP with existing database of IP profiles. (901). A decision segments verify the existence of IP profile (902A) and the matching of such to the IP of the device (903). If an IP profile matching the IP doesn't exist, the present embodiments provide a method to notify the application or creation of an IP profile (902B). After the decision is made, if a match is found, the device may now access the content of IP Profile. It is now announced logged-in into the profile (904). The present embodiments provide methods and systems and applications to display the content of IP profile to the device (905). The present embodiments provide a method to augment the content of profile IP (907A) and applying the changes if the device is enabled to augment (907B) to the current IP profile if a permission is granted to the device (906). If device doesn't have permission to content or it doesn't want to augment to content, it still may stay in the mode to access and display the content. When leaving the network, the present embodiments provide an immediate logging out and disabling access of IP profile from previous device (908). At any step, if the IP of device doesn't match the IP of profile, the display, access and request to augment the content of IP profile is revoked from the device.

Figure 10:
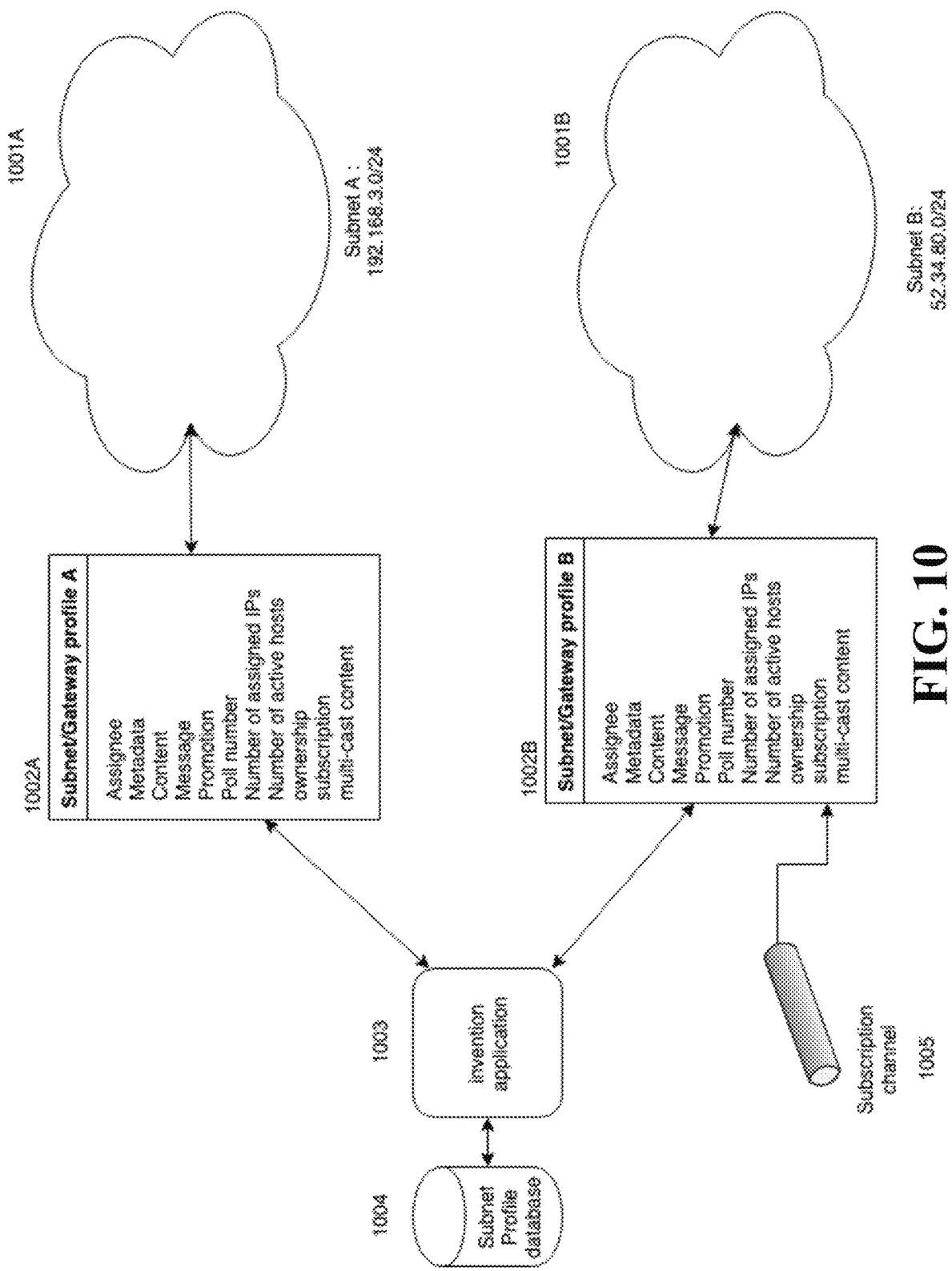
FIG. 10 illustrates the subnet/gateway profiles, according to various aspects of the present disclosure.

FIG. 10 illustrates the subnet/gateway profiles (1001A, 1001B). The gateway profiles are a higher level of profiles (1002A, 1002B), containing more information about the subnet they are assigned to and able to be published and multicast their content to all the nodes (all IP profiles whose IP falls in the range of subnet's IP). The subnet profiles as described in detail with reference to FIG. 6, contain metadata about the subnet and status of the current IP profiles and devices in the subnet. The present embodiments provide an application (1003) and storage to contain the subnet profiles (1004). Updates to subnet profiles and their content. As shown in the figure, a subnet profile may have one or more subscription channels (1005) from which information and content may be pushed to the subnet profiles. The present embodiments provide the application to create, manage, augment content, of these subnet profiles and their content. The present embodiments provide the system and method to store and maintain the subnet profiles. The application (1003) provided in subnet profiling is responsible to validate IP profile members of the subnet group, update the metadata and data of each subnet profiles, permissions to multi-cast, unicast and broadcast content of subnet profiles to members of the subnet and subscribe/unsubscribe to the content channels, advertisement channels/promotion channels and such.

Figure 11:
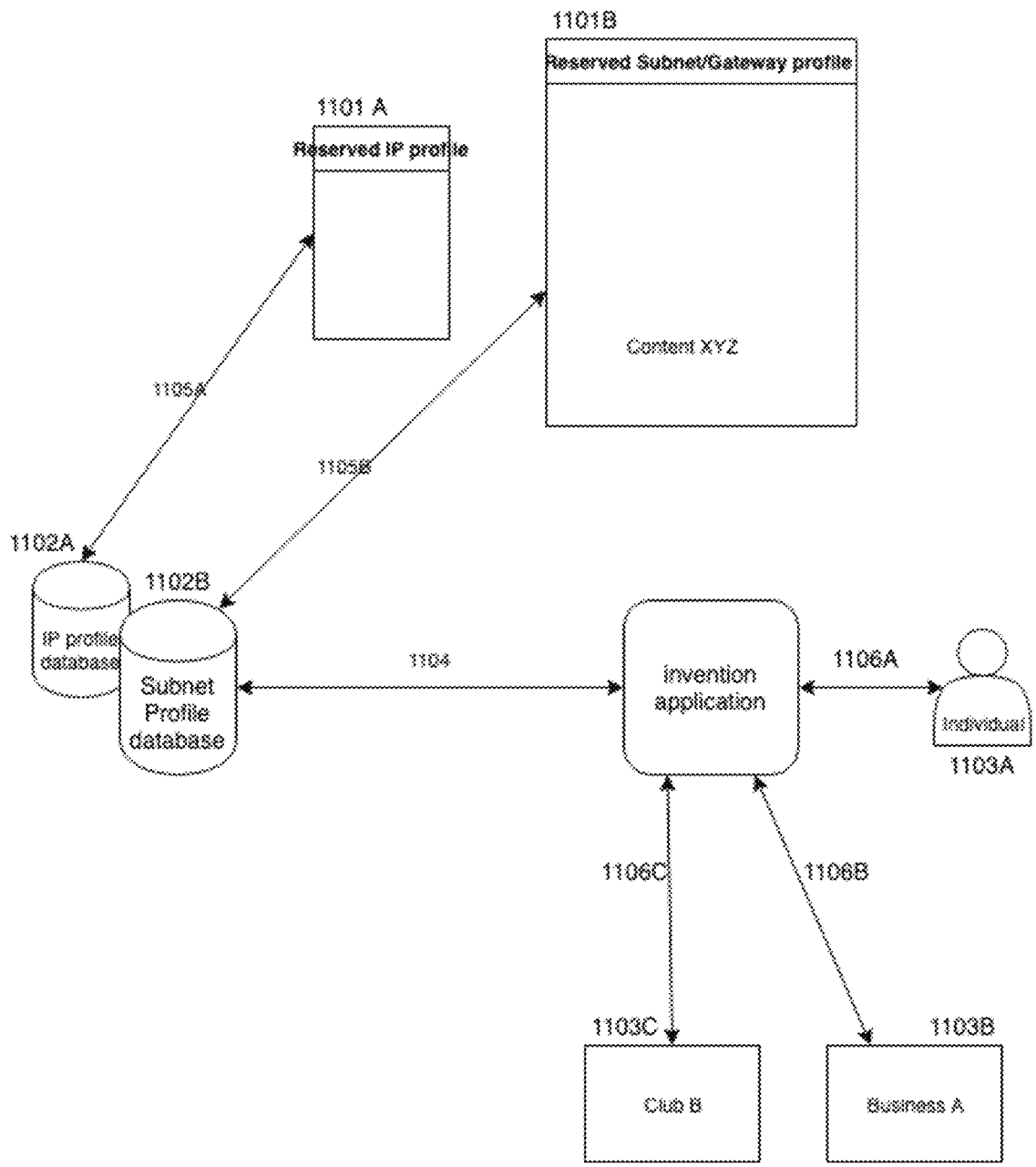
FIG. 11 illustrates Alias profiles as mechanism to add a new IP or subnet IP to databases and manage another IP, according to various aspects of the present disclosure.

FIG. 11 illustrates Alias profile: Another mechanism to add a new sub-net IP (1101B) to databases (1102B) is manually subscribing (1106C,1106B) a group-IP profile with modifiable IP, in this method business (1103B,1103C) or individuals (1103A) may reserve a subnetwork profile (1101B) for their device like WIFI modem and they may manually or automatically (1106A,1106B,1106C) change the IP but still have the same profile (1101A, 1101B), to keep the content of previous IP. (Dynamic IP, constant content, IP/subnet reservation method), The details about alias profiles are provided with reference to FIG. 20 and FIG. 23.

Figure 12:
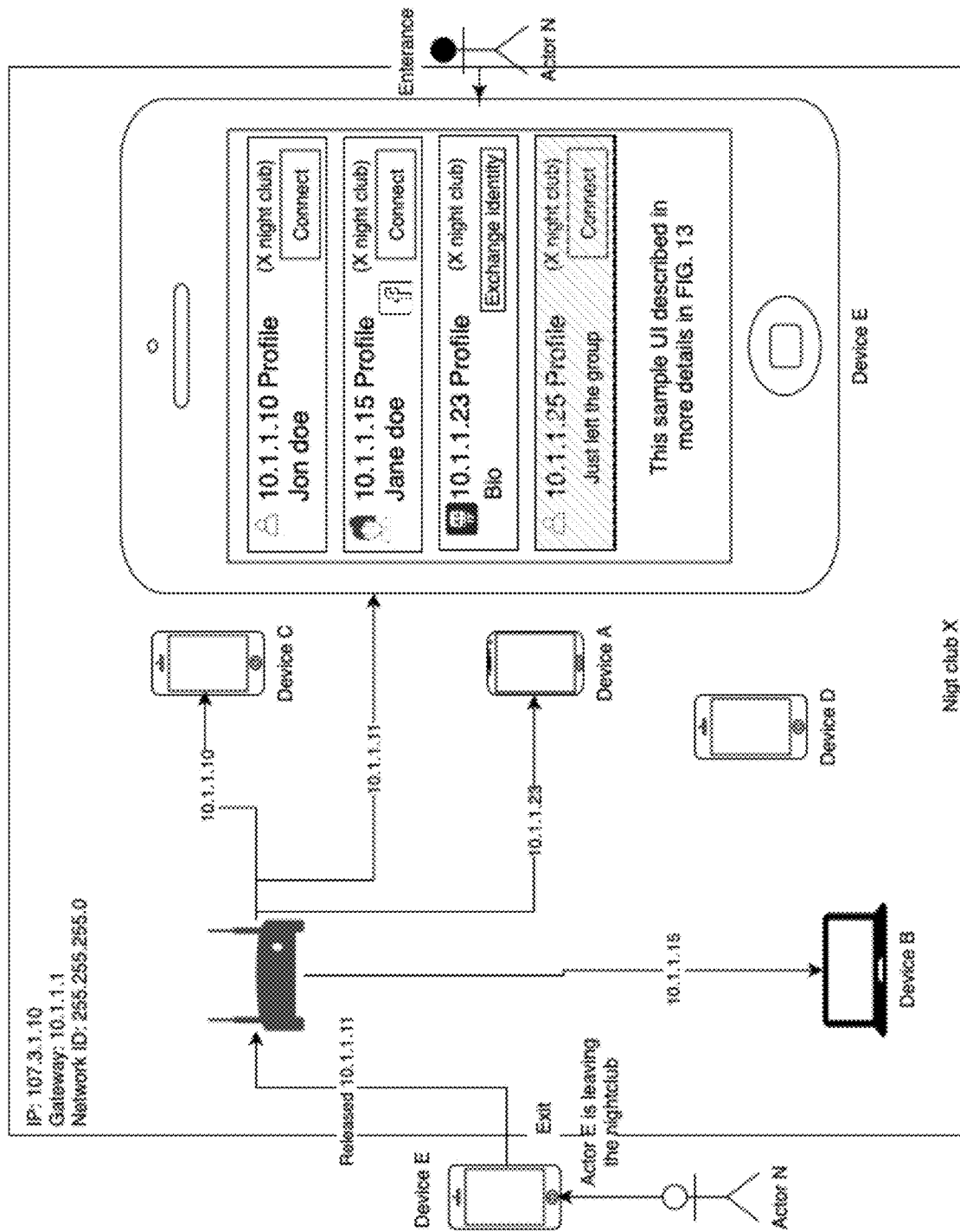
FIG. 12 illustrates a diagram of a sample use-case to show IP auto-sign in in a night club when device is connected to the night club's modem and auto-sign out when it left the network, according to various aspects of the present disclosure.

FIG. 12 is diagram of a sample use-case to show IP auto-sign in in a night club when device is connected to the night club's modem and auto-sign out when it left the network. This embodiment includes creating and assigning a profile to subnets or gateways. In the example diagram, Device A, Device B and Device C are already connected to the network but Device D is not connected to the network in the night club X. Actor N is entered the night club X and decides to connect his device E to the network. The screen of Device E shows a Night club X gateway-subnet profile (107.3.1.10/24-10.1.1.1/24) when it enters the network (The screen is described in detail in FIG. 13). In this example, Device A, Device B and Device C are listed in Subnet profile for Device E because all are connected to local network and has same IP range. Device is no listed because it is not connected to the network. Device C and Device B are online in identified mode because they have revealed their identity (using a process described in FIG. 13 and FIG. 14). Device C communicate using 10.1.1.10/24 and as Jon doe identity and Device B communicate using 10.1.1.15/24 and as Jane Doe identity. Device A in the other hand has not revealed its identity (default mode) but it might provide some information or description for their IP profile including but not limited to profile picture and some biography information. Device in the subnet profile's chatroom may exchange identity (as described in FIG. 13 or FIG. 14). Once Actor N is left the night club, it releases the IP (10.1.1.11/24) and subsequently leave the network and automatically sign-out and leave the subnet profile. So, it will be disappeared from or disabled in the subnet profile as shown in screen E. The devices in the network won't see device E anymore once it left the network. Anyone inside or outside the network trying to peep the subnet they won't see the device E anymore (Peeping on as describe in FIG. 19, FIG. 23).

Figure 13:
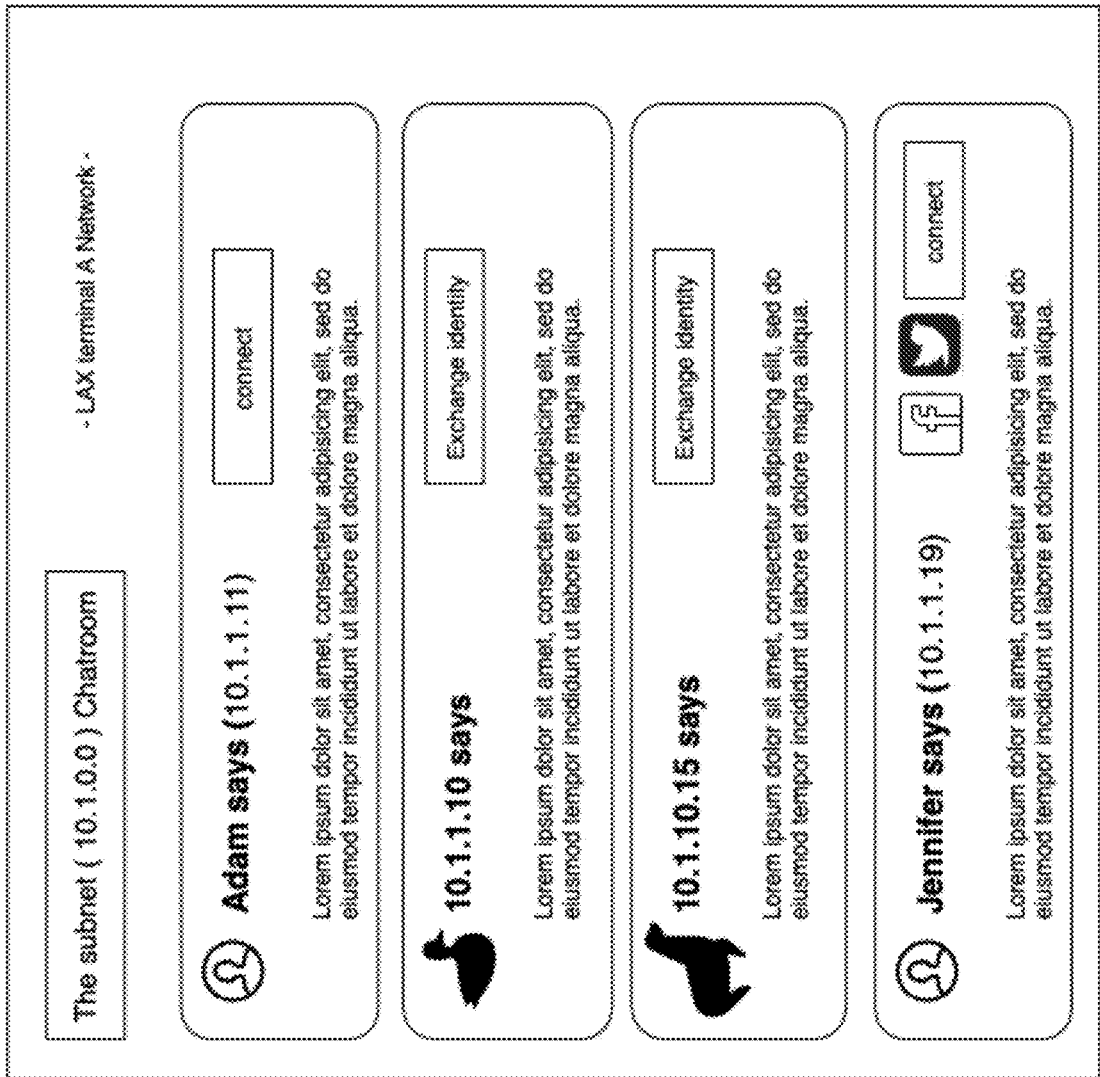
FIG. 13 is a schematic front view of a computing device that may include an application program for of a chatroom as a group nature feature example for subnet/gateway profile, according to various aspects of the present disclosure.

FIG. 13 illustrates a sample user interface of a chatroom as a group nature feature example for subnet/gateway profile is shown in the FIG. 6. There are 4 devices online (different Ips) in this subnet and two already revealed their identity and the last one connected her social media to her profile. Two other messages sent in anonymous (default) mode with different avatar or pictures setup as their profile picture.

With reference to FIG. 13, Adam or Jenifer may decide to send some message without using an identified account in any given time by changing or disconnecting it from their IP profile data or simply change their account to anonymous if they are using saved accounts. Any device in the subnet might request for identity exchange or going public for all if an account is anonymous or specific identity is not provided. In the other hand the anonymous mode might decide to reveal their identity to specific identified device or stay anonymous for others. The exchange might happen in one-way or two-way mechanism. The two-way identity exchange simultaneously is shown in FIG. 14 and it may be done only if both sides has the identity verified beforehand.

With reference to FIG. 13, some embodiments may also list online IP profiles in the subnet or number of offline IP may be listed. In an IP profile associated with the private network, some embodiments may show devices in the network that are not using the application or website using network characteristic and tools. For example, using broadcasting feature or network status providers.

Figure 14:
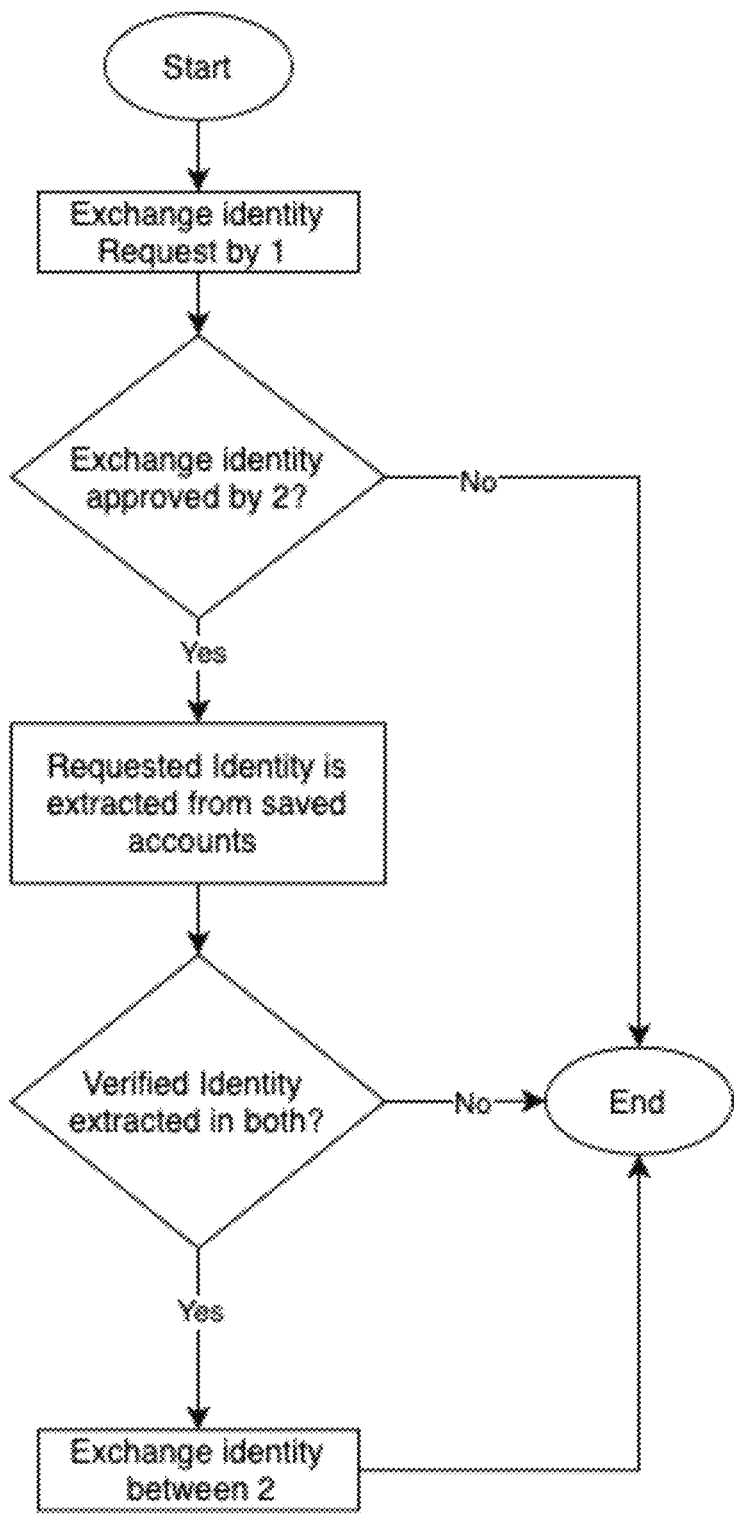
FIG. 14 is a flowchart illustrating a sample process of exchanging identity simultaneously between two users, according to various aspects of the present disclosure.

FIG. 14 is a flowchart illustrating a sample process of exchanging identity simultaneously between two users, according to various aspects of the present disclosure, first any of two side requests for exchanging identity and then the other side receive the request and approve or reject the exchange. If the request is approved and the requested identity is available by both sides the identity is extracted from both sides and the identity will be visible to both sides simultaneously.

FIG. 15 illustrates a sample output for Traceroute a network tool. The data is transmitted through the Internet as data packets. Traceroute is used to determine the "path" packets take from one IP address to another on "device A" in FIG. 17, according to prior art; Traceroute, also called "tracepath" or "tracert", is a network tool used to determine the "path" packets take from one IP address to another. It provides the hostname, IP address, and the response time to a ping. Width reference to FIG. 15 a sample output for running this command on "device A" in the FIG. 16. In this case Packet pass through 10 gateways in this example.

Figure 16:
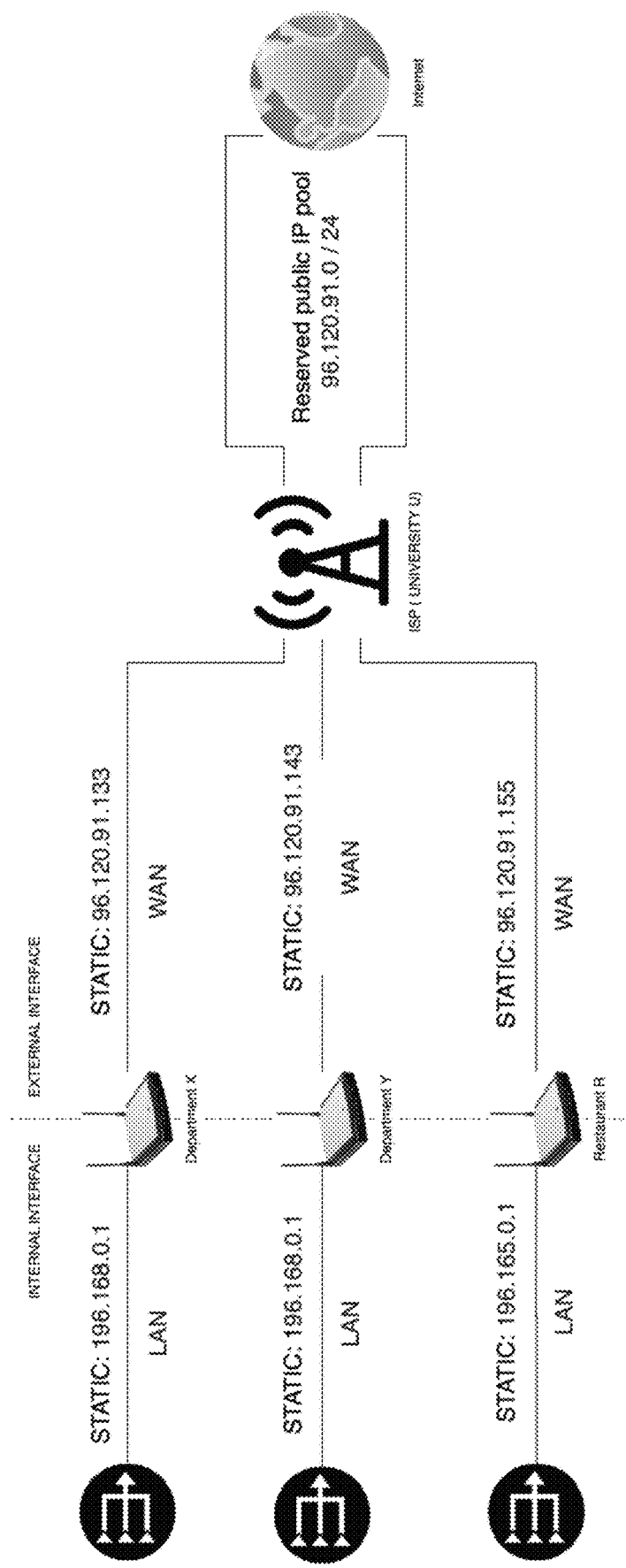
FIG. 16 illustrates a sample visualization of network structure based on FIG. 15 packet path, according to prior art.
Figure 17:
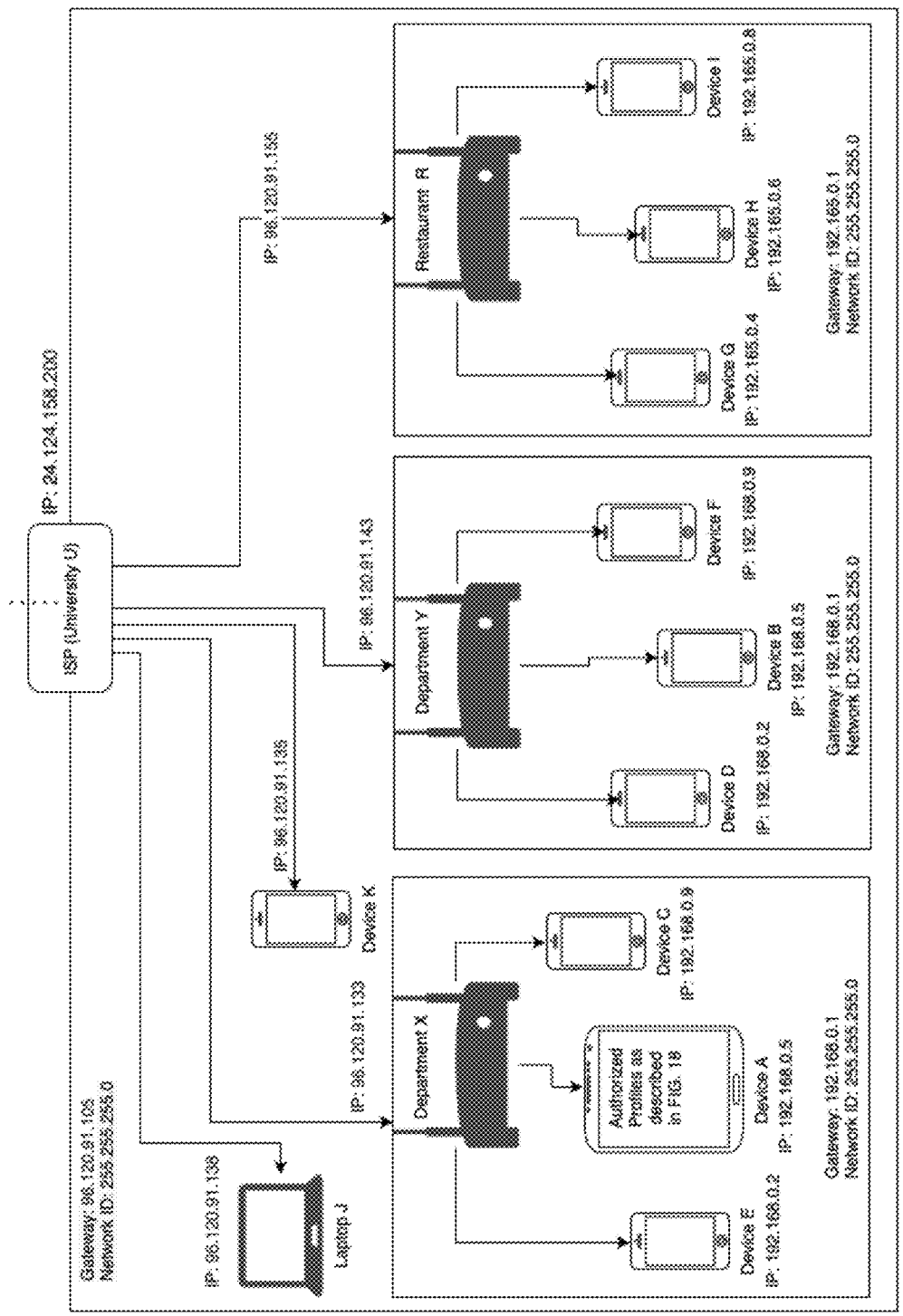
FIG. 17 illustrates a sample use-case shows IP assignment in internet hierarchy and authorized IP/subnet/network profiles for devices inside the network based on FIG. 16, according to various aspects of the present disclosure.

FIG. 16 illustrates a sample visualization of network structure based on FIG. 15 packet path, according to prior art; As described in FIG. 5, the IP assignment through the Internet has a hierarchy structure and it consist of many subnet networks with different network Ids. FIG. 17 illustrates this hierarchy in more details and describes utility offered by the present embodiments in this example network setup and method of using the characteristic of IP and network structure to achieve the present embodiments purpose.

FIG. 17 illustrates a sample use-case shows IP assignment in the Internet hierarchy and authorized IP/subnet/network profiles for devices inside the network based on FIG. 16, according to various aspects of the present disclosure; Device A is part of a network in Department X and given IP 192.168.0.5, so the Device A is authorized to view and manage content for 192.168.0.5 in this private network. As mentioned, Device A is part of the Department X private network. Device E and Device C are also part of the Department X network. Device A, Device E and device C and all other device with assigned IP in this network are also authorized to access to 192.168.0.0 Subnet profile or (192.168.0.1/96.120.91.133) gateway profile, since all of these devices are part of the network 192.168.0.0 with subnet mask 255.255.255.0 with gateway IP 192.168.0.1. So, in other words all device with IP start with 192.168.0 are authorized to access this subnet profile. One thing to pay attention is that all devices in Department Y also use same range of IPs as it is used in Department X but any given IP (like 192.168.0.2) will have different IP profiles although they are same (Device A and Device D). This is because they are in different networks, which are treated differently. So, the visible content inside 192.168.0.2 IP profile for Device A may be completely different than those in 192.168.0.2 IP profile for Device D. To understand the reason, one should consider the hierarchy structure in IP assignment for "device A" has 96.120.91.133>192.168.0.2 and for "device B" has 96.120.91.143>192.168.0.2. So, all Device D, Device B, Device F may access and communicate using (96.120.91.143>192.168.0.0) subnet profile or (192.168.0.1/96.120.91.143) gateway profile. However, the private network may use very different range of IPs (92.165.0.0) like the Restaurant R router. For same reason Device G, Device H, Device I, are authorized to access and append or communicate through (96.120.91.155>192.165.0.0) subnet profile or (192.165.0.1/96.120.91.155) gateway profile.

With reference to FIG. 17, there is also IP profile in the diagram through which Device A and Device B may both access and communicate because of the IP assignment hierarchy structure. As shown in the diagram Department X (96.120.91.133), Department Y (96.120.91.143) and Department R (96.120.91.155) are all using public static IPs in same network themselves (96.120.91.0—IP mask 255.255.255.0). Laptop J and Device K (96.120.91.138) also belong to this network as well because they are given IPs start with 96.120.91.0 with gateway 96.120.91.105. So, all devices shown in diagram A-K may access and communicate using IP subnet profile 96.120.91.0 or IP Gateway profile 96.120.91.105 or 24.124.158.200.

Figure 18:
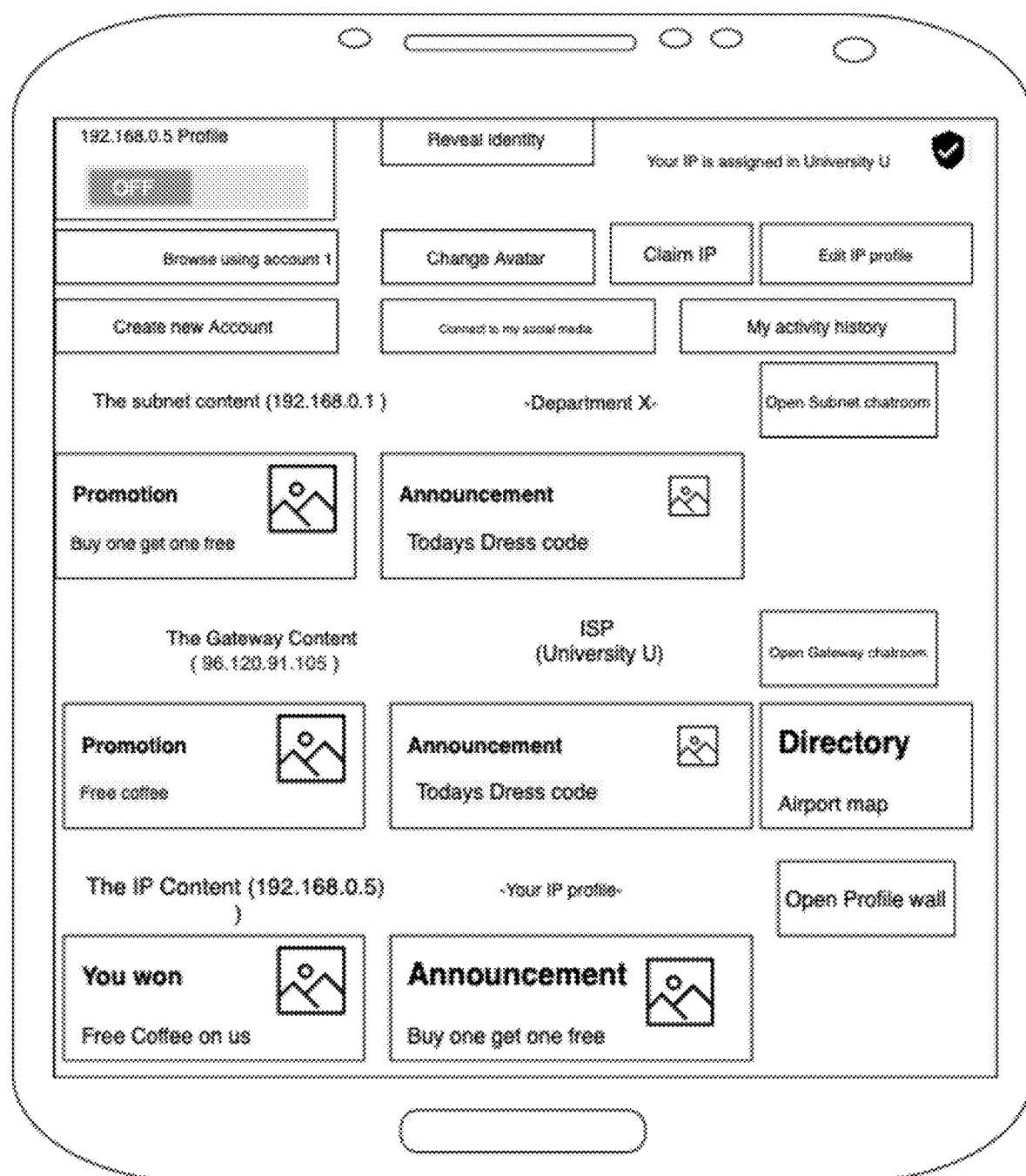
FIG. 18 is a schematic front view of a computing device that may include an application program for sample IP Profile after a device is authorized automatically once connected to network based on FIG. 17, according to various aspects of the present disclosure.

FIG. 18 is a schematic front view of a computing device that may include an application program for sample IP Profile after a device is authorized automatically once connected to the example network setup based on FIG. 17, according to various aspects of the present disclosure; All authorized IP/Subnet/Gateway on device A is shown in sample user interface in diagram. Each Profile may list some content including but not limited to promotions, announcements, map and etc. This content may be listed through the IP profile manager (Described in FIG. 21 below) based on the range of the IP or IP Assignment strategy in organization or Global organization or standards.

With reference to FIG. 18, since multiple device may be part of subnet or network (With same Gateways) they may be treated as groups or rooms, so group features including but not limited to chatrooms and forums may be defined for these profiles. With reference to FIG. 18 For example, "Device A" may open associated chatroom and communicate with all devices with same Gateway or inside same subnet. In other hand, the IP profile is features with more like ownable standalone profile pages with features like a profile. Most of social media features may be defined for existing IP profiles belong to all devices inside same subnet or with same Gateways.

With reference to FIG. 18, The user of the device may manage the IP profile belong to their IP as long as it uses that IP in the network, once they release the IP, they cannot manage or do activity as the IP owner anymore.

With reference to FIG. 18, for example, by default IP profile may be offline and the user decide to go Online and be visible to all or subset of devices in a group nature IP profiles (subnet profile). Also, by default the user of the IP profile might be anonymous and unknown or it is known but the user decides to stay anonymous while using the IP profile. However, the user might decide to reveal their identity whenever they desire. As shown in the sample user interface the IP profile might be populated with more user-friendly information from IP mete data, DHCP, ISP, ICANN or any third-party entity involved in IP assignment. For example, some embodiments may recognize that IP is in range which is belong to University U or Airport X or fetch or interpret some geolocation data by looking at IP address value.

Figure 19:
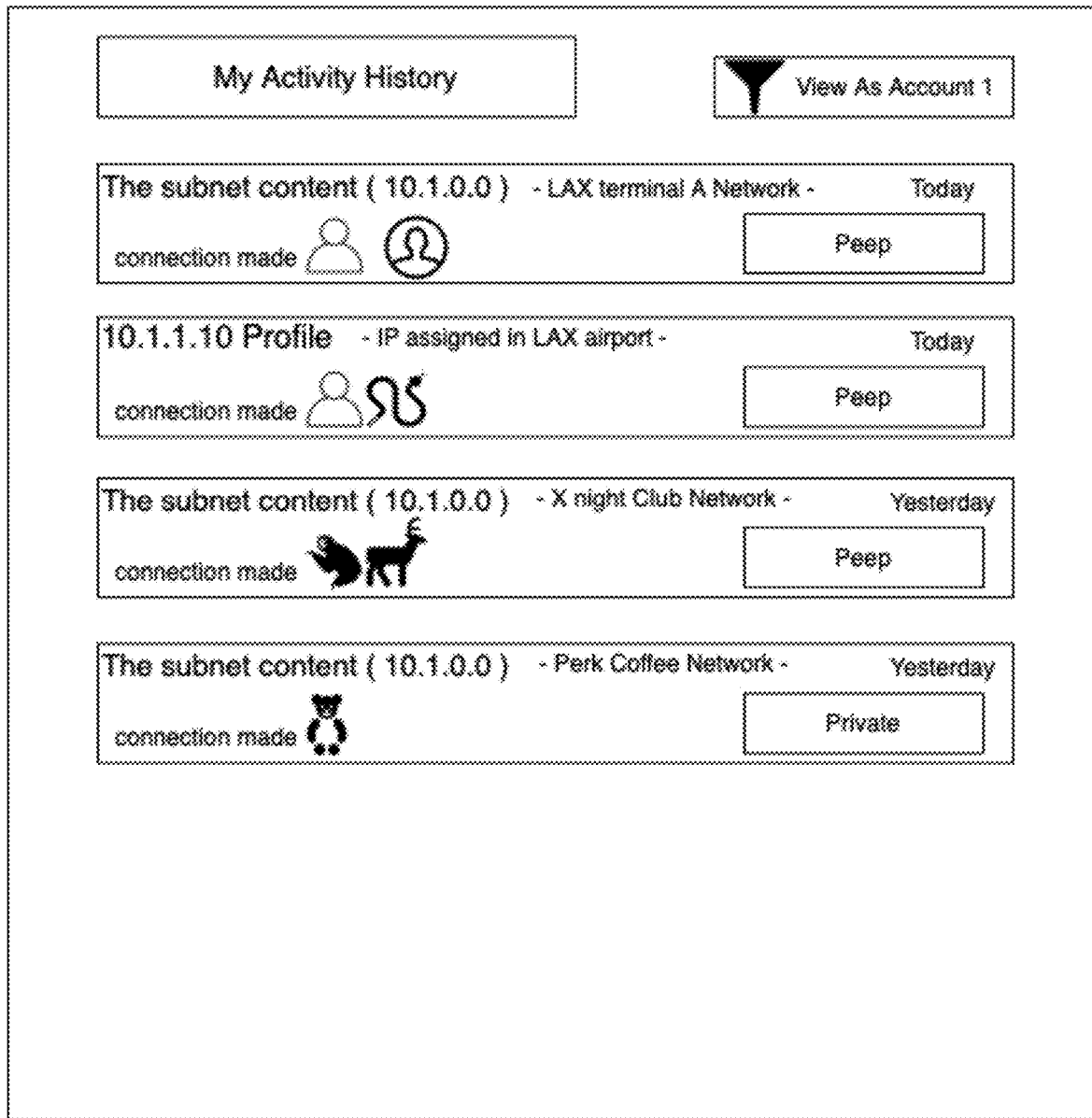
FIG. 19 is a schematic front view of a computing device that may include an application program for logging and listing the activity of the user while user is using the profile, according to various aspects of the present disclosure.

With reference to FIG. 18, the users IP profiles may connect their profile with any third-party account as long as they have access to that profile. For example, they may connect any of their social media or affiliated accounts so that their activities would have traces of their social media in them. For example, when using their social media X account to add some announcement to the IP profile page, it may show a link to their social media profile on top of the announcement. Or the user may change IP profile picture or avatar to their desired personal or non-personal ones. The user may save these setups as accounts. For example, they might define an account with no identity and with only an avatar as profile picture and another account connected to their university verified email and another one connected to the social media X. The user may use any of previous account or create new one while the profile is Online. In this case, for example as shown in FIG. 19 and described in more details other devices may view the content in different way base on the account is selected by the user while using the IP profile. To access these accounts, there is a need for a database and a verification method like account ID and pin or password similar to regular online accounts, However, having these accounts are optional and user may always setup their desire way through the IP profile as long as they are using the IP.

With reference to FIG. 18, some embodiments may provide one or more built-in accounts for IP profile devices using device MAC address or associated device identifications. Using this method, the account is bound with device. In other words, these types of accounts are "device accounts" not "user accounts". So, there is no need for creating account or pin and password for built-in device bound account like those accounts' user create for storing the setting and logging the activities. If "device accounts"

are used, some embodiments store the setting and log the activity with MAC address, or any available Device related global identification. A media access control (MAC) address is a unique identifier assigned to a network interface controller for use as a network address in communications within a network segment. Some embodiments may create MAC profiles similar to IP profiles with difference that MAC profiles' ownership is often permanent and rarely changed. This is the reason some embodiments consider it for building built-in accounts in the system.

FIG. 19 is a schematic front view of a computing device that may include an application program for logging and listing the activity of the user while user is using the profile, according to various aspects of the present disclosure; With reference to FIG. 19, while user is using the profile, the activity of the user may be logged and may be listed.

With reference to FIG. 19, For example, the user visited three different subnets and connected to 3 different subnet profile and an IP profile and also might list the connected identities in those profile. As you see in the diagram the IP profile might be private and only accessible to the current owner of the IP profile. Restrictions may apply by the current owner of the IP profile or the IP profile manager that handle the IP profiles (Described in FIG. 21).

Figure 20:
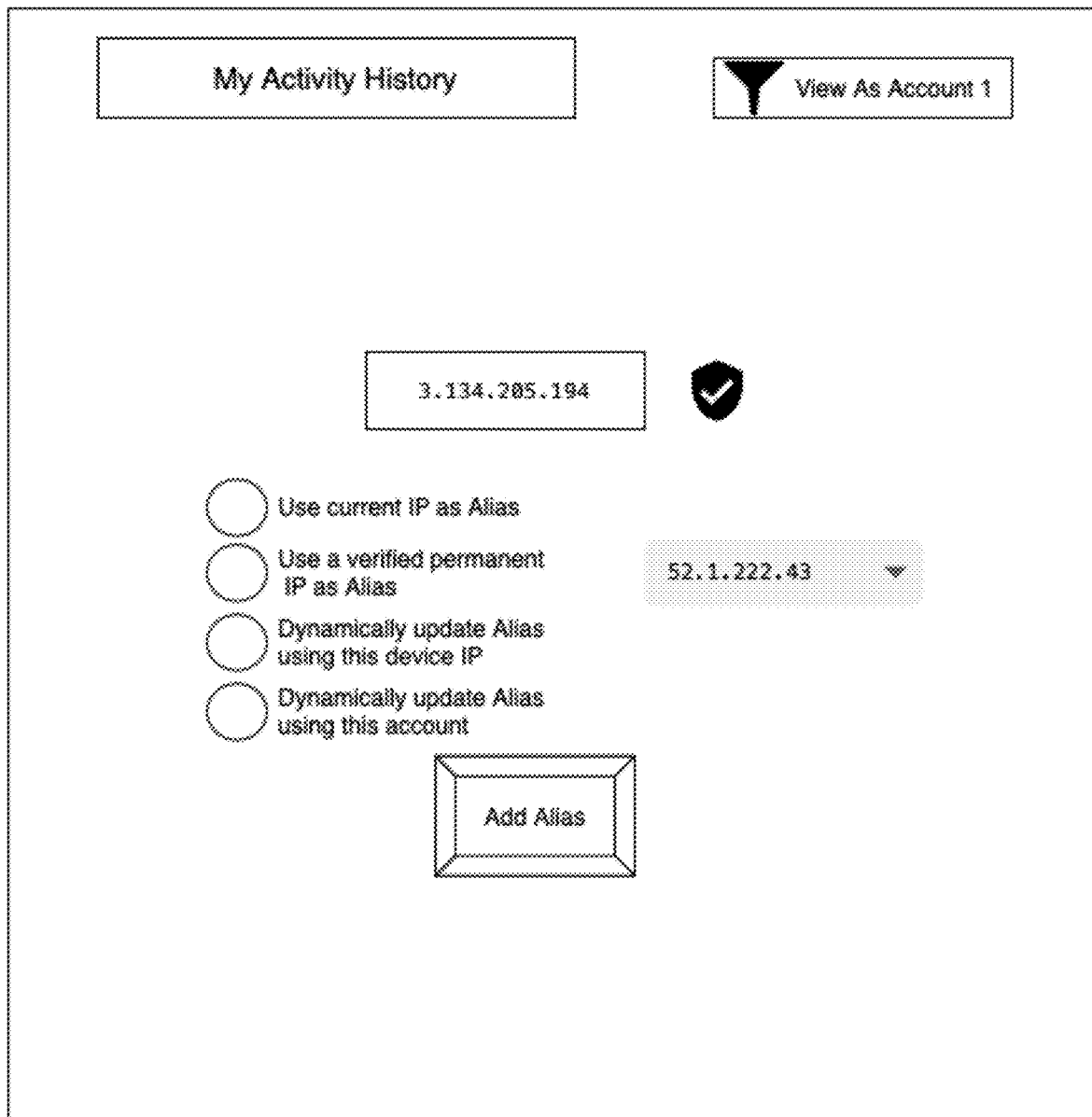
FIG. 20 is a schematic front view of a computing device that may include an application program for assigning alias IP to manage another IP profile, according to various aspects of the present disclosure.

FIG. 20 is a schematic front view of a computing device that may include an application program for assigning alias IP to manage another IP profile, according to various aspects of the present disclosure; With reference to FIG. 20, the IP "3.134.205.194" is already verified by the user using various method to be belonged to the user of the device. Verification method may be sending specific message from the device with that IP (Described in FIG. 24) or even using DNS verification method like adding DNS record to the domain DNS setting (In case IP correspond to a domain name) and etc. Once the IP ownership is verified the user may manage and view the IP profile from the Alias's view. For example, in this diagram the device is may view IP profile as device with 3.134.205.194 IP address. The user might define another IP as alias to another verified IP so that the device with alias IP may manage the verified IP. This is useful when the owner of the verified IP wants to delegate the management to another device used by another user without doing verification process on delegated device. Also, another example use-case is dynamically updating the alias to the new IP on the device or IP address belong to an existing account so that it is logically bind to the device or account.

Figure 21:
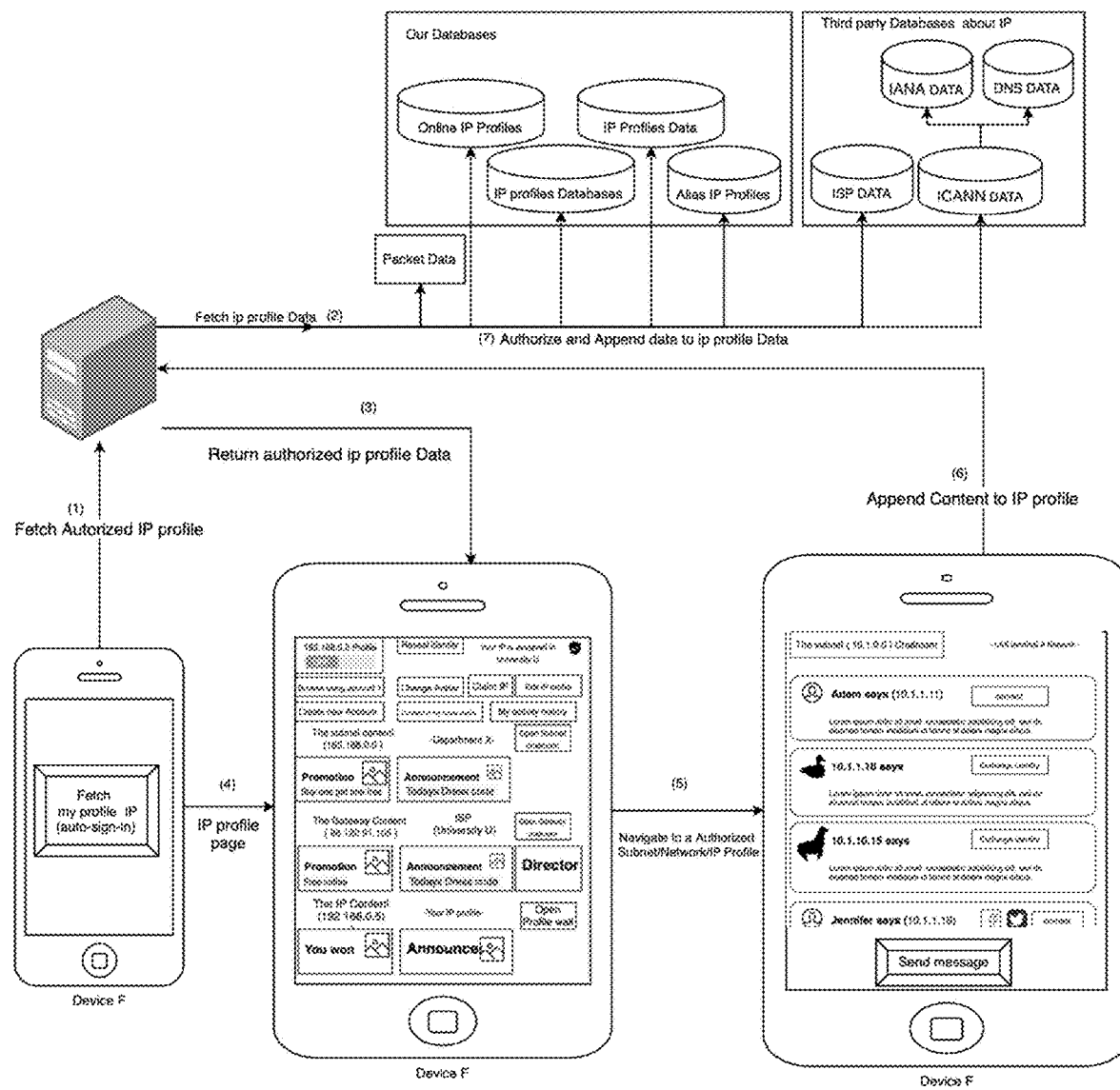
FIG. 21 illustrate steps in a sample process of auto-sign in and fetching the IP profile when connected to the network, according to various aspects of the present disclosure.

FIG. 21 illustrate steps in a sample process of auto-sign in and fetching the IP profile when connected to the network, according to various aspects of the present disclosure; With reference to FIG. 21 First step is (1) Fetching Authorized IP profile from the IP profile manager. (1) may be initiated by clicking a button or automatically right after receiving new IP or launching the application on device (One approach described in flowchart FIG. 8 and FIG. 9). Second step (2) is to fetch authorized IP profile data by checking parameters in Packet Data, executing domestic databases (Online IP profiles, IP profile database and their data, Aliases, etc.) queries or executing queries on third party databases about IP (ICANN Data, ISP data, etc.). Once data is ready the IP profile manager return authorized IP profile data to the device F screen (4). The data is shown in user interface like FIG. 18. The user of device F may manage or navigate to different IP or subnet IP profiles for example by checking subnet profile's chatroom (5), the user may append content to the IP profile (6) for example send a message to the chatroom so other devices in the same subnet profile may see. IP profile manager receive the request to append data (6). IP profile manager check if the device is authorized user of the IP profile and append data to the appropriate database (7).

Figure 22:
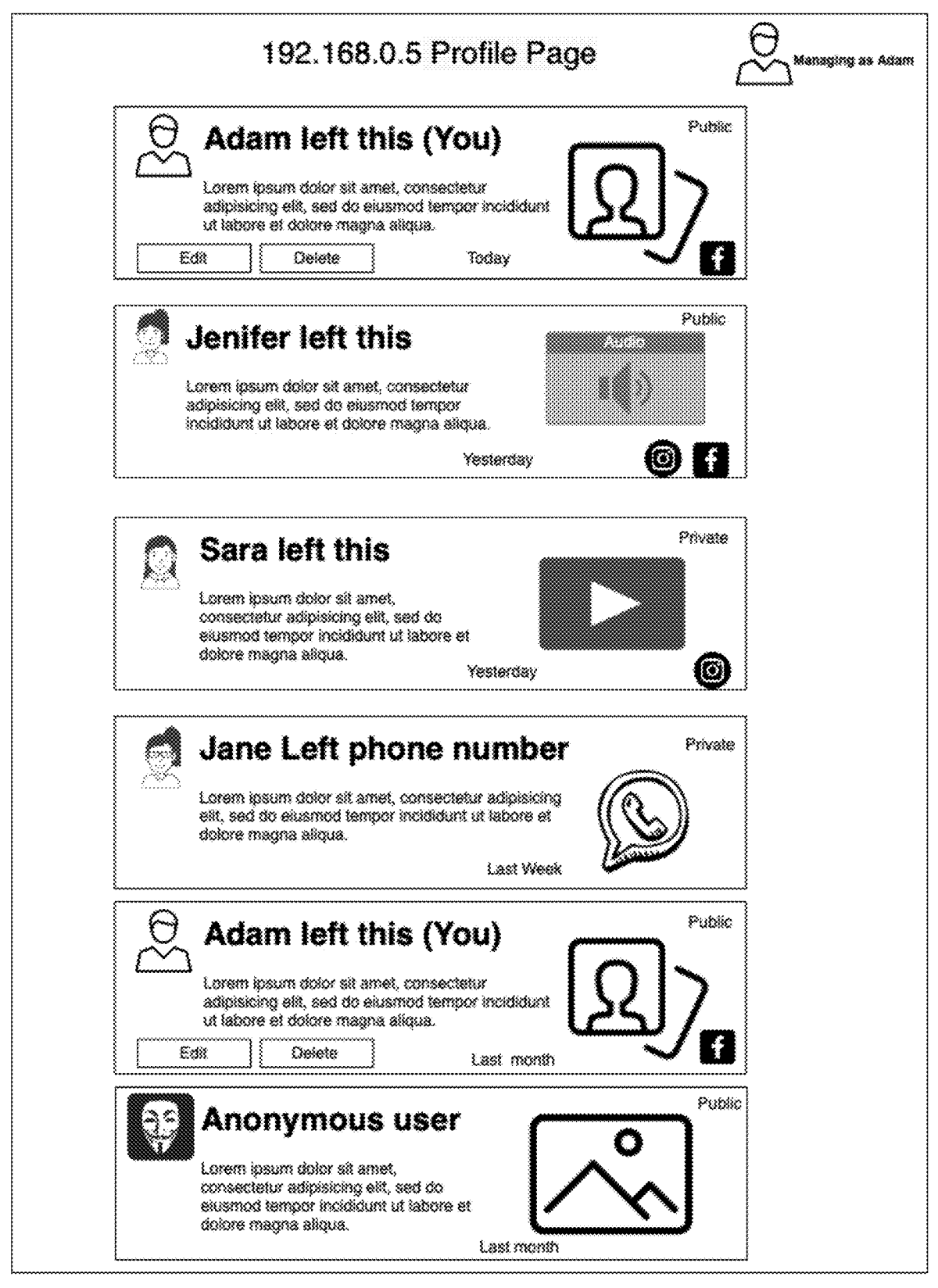

FIG. 22 is a schematic front view of a computing device that may include an application program for each IP profile illustrate temporary ownership of IP profile and passing ownership to different users when IP is given to different users, according to various aspects of the present disclosure; With reference to FIG. 22, the profile content is added by previous owners by time. In the sample diagram, profile 192.168.0.5 is shown at the time the device holding this IP is online as Adam. Adam has left a message today and last month. In this example, the author of the content only may manage (edit, delete, etc.) their own content that appeared in the page. As shown in this example Adam previously used same IP last month and then Jane's device given this IP so she could add content to the page. Jane chose to leave content privately or width restricted access so only future holders of the IP or specific accounts in her cycle may view the content. Her device released the IP, so it is signed out from the profile at some point, so the IP is given to Sara yesterday and Sara added her content to the page in private mode also. Sara probably disconnected from the network and is given another IP instead of 192.168.0.5. So, Sara release her control over this profile, and she may add content to her new profile and not 192.168.0.5. Then IP is given to Jenifer right after Sara, so from that moment, she is the one may add content to the profile. Jenifer add her content in public mode so everyone may view her content (even those not authorized in the profile may peep on profiles, refer to examples in FIG. 25 and FIG. 26) when peeping into the profile happens (e.g., Limited access view, Overview, Meta data only). So, some content inside the page might be hidden from some viewer and be visible to others, the author may choose who will be able to view her or his content when content is being added to the profile. As shown in the diagram the holder of IP may choose to add content anonymously.

Figure 23:
FIG. 23 is a diagram illustrating an example for ability to claim some IP profiles like corresponding internet protocols address to domain names and possibility of managing them using alias IP based on FIG. 11, according to various aspects of the present disclosure.

FIG. 23 is a diagram illustrating an example for ability to claim some IP profiles including but not limited to those corresponding "internet protocols address (IP)" to domain names and possibility of managing them using alias IP based on FIG. 11 and FIG. 20, according to various aspects of the present disclosure; With reference to FIG. 23, the diagram also shows the ability of listing the profiles based on the activity inside them. This example shows the most popular profiles and list them for other online IP profiles to take a peek and follow the activity inside them if they are accessible (the profile might be restricted by current IP Profile holder or IP Profile Manager). For example, in LAX Subnet profile, IP profile corresponding to LAX website is managed using alias device (described in FIG. 20). One benefit of using claimed IP and managing them using aliases is that the content coming from "flylax.com" profile may be treated as official content or verified message by LAX inside different profiles since this profile is verified by LAX. Another benefit for claimed IPs (corresponding to domains) is using other IP characteristics including but not limited to geolocation nature of IP assignment to list similar IPs for example all inside California or specific region. For similar reason IP range and IP from specific network may be used as affiliation, for example if IP is recognized as University U, some embodiments may assume the user of the device is probably affiliated to the University U, for example student, professor, employee or a campus visitor. And the IP corresponding to "usc.edu" may be treated as official account for USC, so student may follow the statement by this profile in various IP profiles including University U corresponding subnet profiles with peace of mind.

Figure 24:
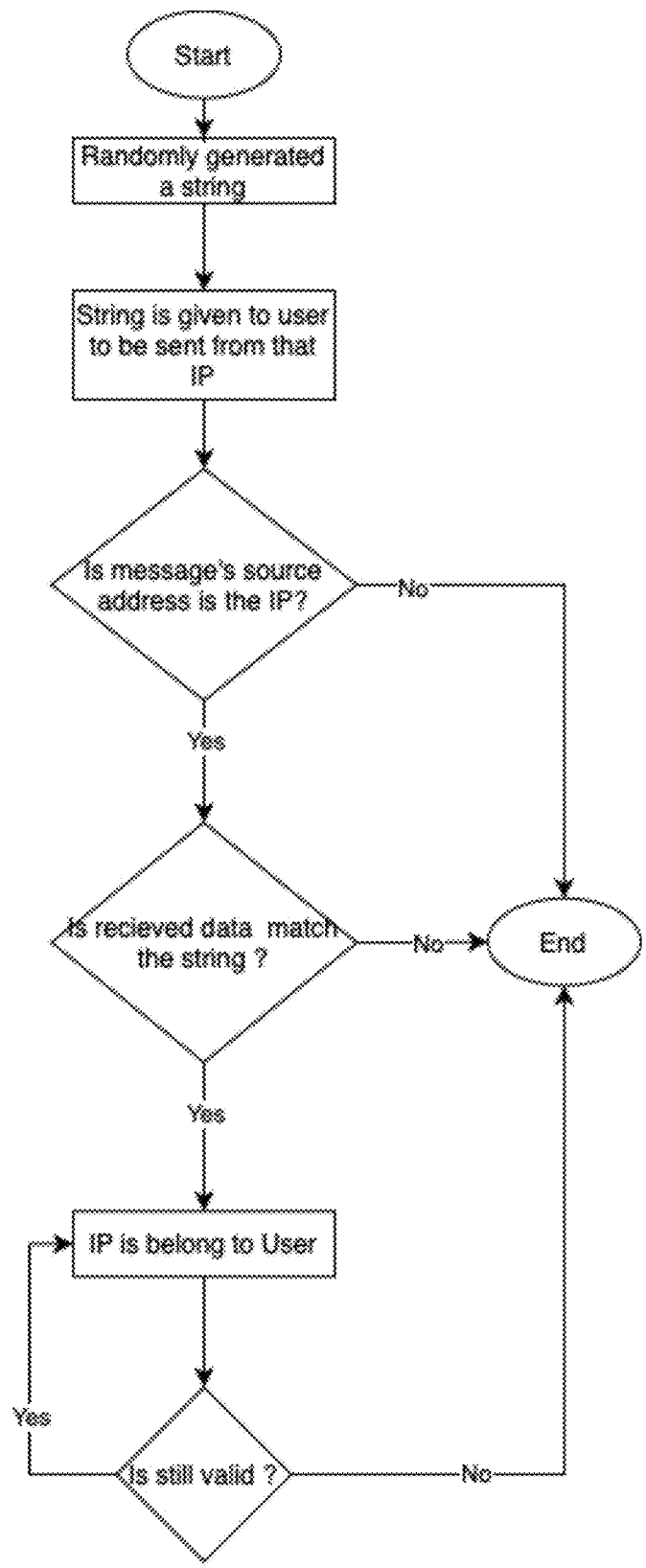
FIG. 24 is a flowchart illustrating a sample process of verifying IP ownership in order to initiate claim or alias assignment, according to various aspects of the present disclosure.

FIG. 24 is a flowchart illustrating a sample process of verifying IP ownership in order to initiate claim or alias assignment, according to various aspects of the present disclosure; With reference to FIG. 24 the random string being generated and given to user and asked to be sent using the device holding that IP. The Profile manager (IP Profile Manager in FIG. 21 for IP profiles) will listen to message from the IP (Source) and once it received the matched string the verification is completed otherwise if message is not received in specific period of time it will be rejected.

With reference to FIG. 24, IP may stay verified for specific period of time and expired after that so if it is used as alias that will be expired too. If a new verification comes inside this period, some embodiments may abandon the previous one and renew the verification or verify the IP for the new requester. IP profile manager may decide how long this verification and associated alias stay valid.

With reference to FIG. 24, some embodiments may use the described process continuously every t second automatically by sending message or ping request using client embodiment or application installed on device as "heartbeat". Once one or more round of process described in FIG. 24 failed some embodiments may expire some or all of given authorizations. Some embodiments may send encryption and decryption to make sure the data is sent by embodiment and not unauthorized embodiment.

With reference to FIG. 24, since some embodiments may use ping request or an empty request without any message in some occasions because some embodiments are only concern about the source of request. However also checking with verifiable message as extra level of percussion in case by coincidence, unrelated request is coming from the source.

Figure 25:
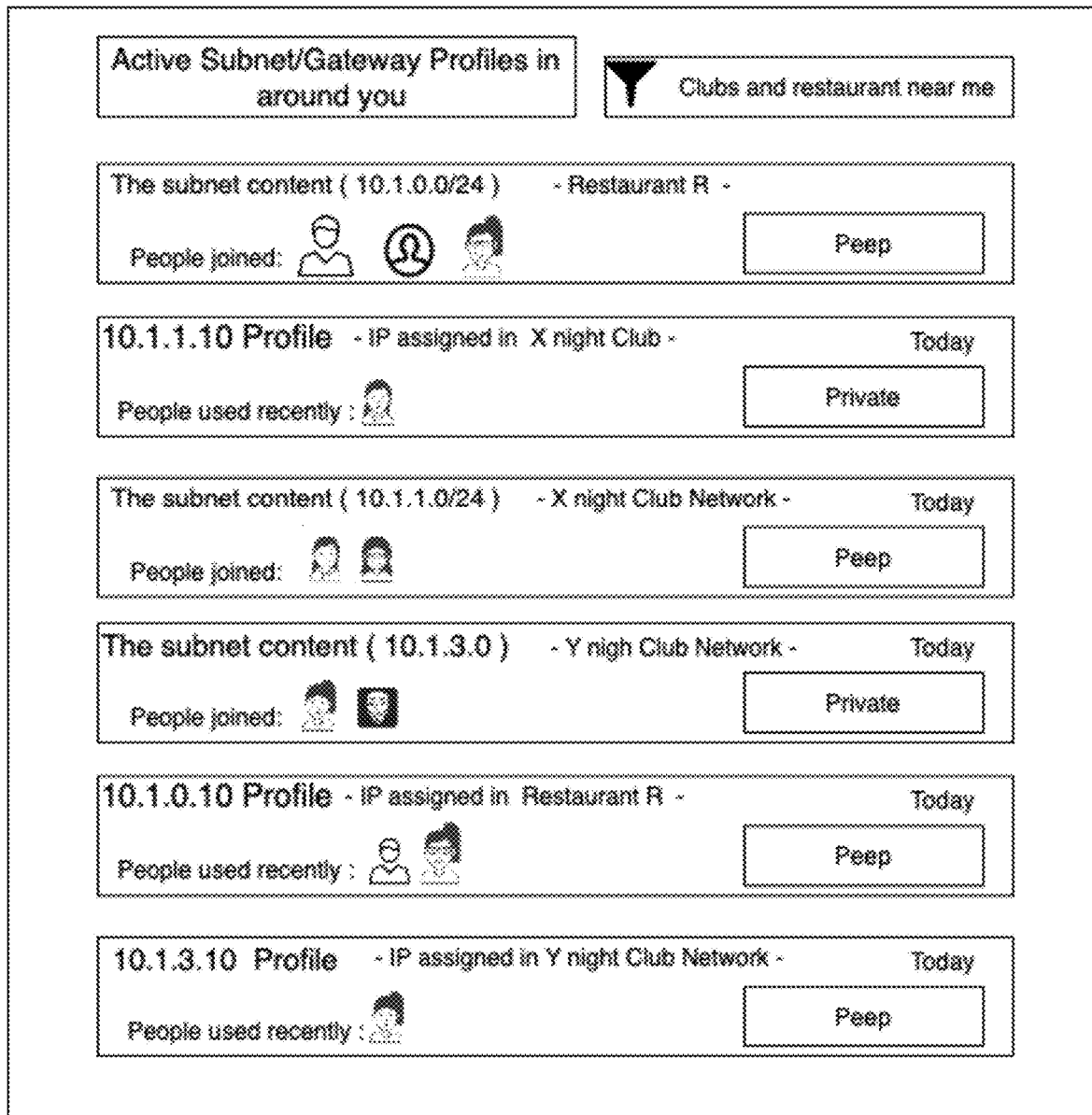
FIG. 25 is a diagram illustrating an example, using IP Metadata and assignment information including geolocations to list active profiles related to the device's IP profile, according to various aspects of the present disclosure.

FIG. 25 is a diagram illustrating an example, using IP Metadata and assignment information including geolocations to list active profiles related to the device's IP profile, according to various aspects of the present disclosure; IPs are assigned according to the standard and also some embodiments may get much more information based on the IP from different source. Some embodiments may fetch the related data as described in FIG. 21 and filter IP profiles based on any of the information related to IP.

With reference to FIG. 25, For example this example filters all profiles belong to IPs assigned in clubs and restaurant in specific region. Night club X, Y and restaurant R subnet/gateway profiles along with some public individual IP profiles in those locations are listed in this example. Each profile also shows contributors to listed profiles or those in some point used those IP profiles and were given IP in their range or that IP.

Figure 26:
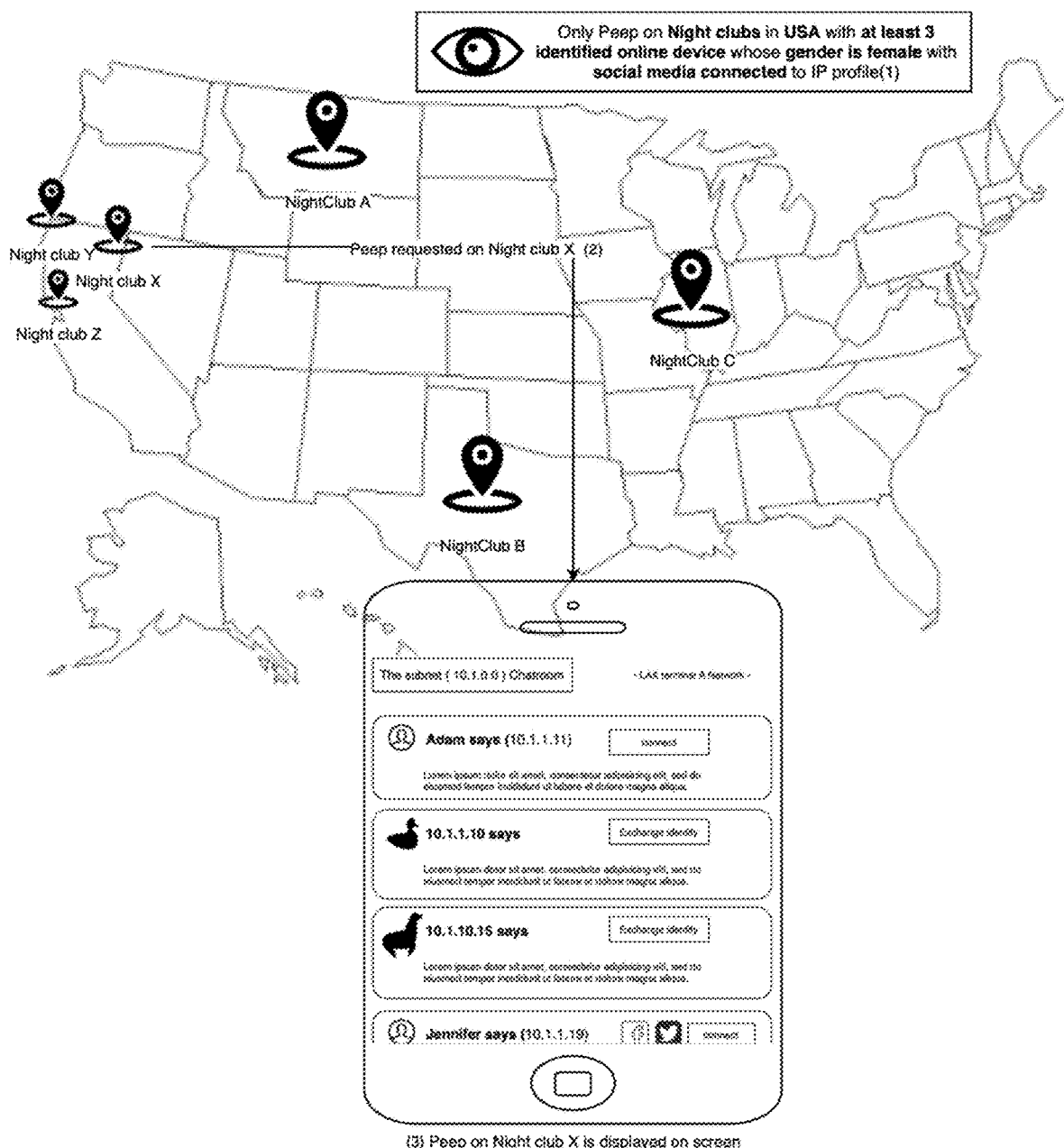
FIG. 26 is a schematic front view of a computing device that may include an application program for peeping on collection of profiles filtered by a parameter, according to various aspects of the present disclosure.

FIG. 26 is a schematic front view of a computing device that may include an application program for peeping on collection of profiles filtered by a parameter, according to various aspects of the present disclosure; Parameters include but not limited to profile content, IP holders, managing accounts or related public IP meta data and information like geolocation data.

With reference to FIG. 26, the user requested to visualize the online profiles based on the geolocation and only shows those with at least 3 identified online device with female user who are online with connected social media to their profile. The qualified profiles are shown on map including night club X, Y, Z, A, B, C. The user may click on each one and peep on the profile and see overview, part or all content inside the profile. Here user is clicked on Night club X and the content is listed on the screen. The user might see part or all people currently in the network.

Figure 27:
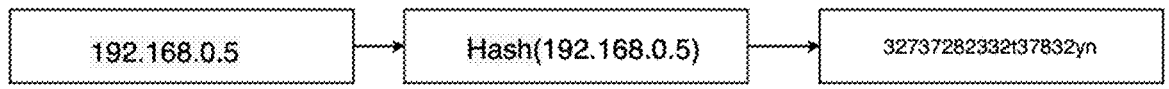
FIG. 27 illustrates a sample approaches to map IPs to human friendly version or hide IP from users for security or simplicity reasons, according to various aspects of the present disclosure.
Figure 27:
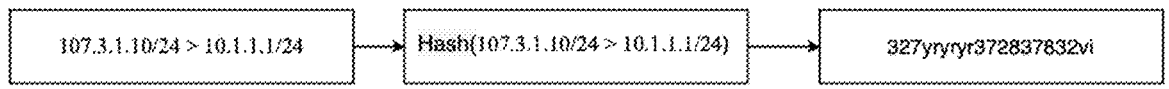
Figure 27:
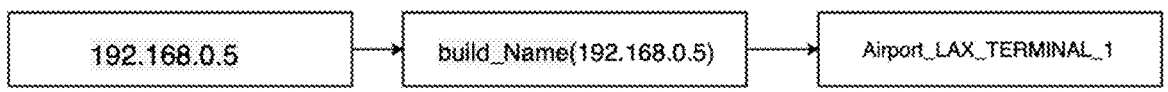
Figure 27:
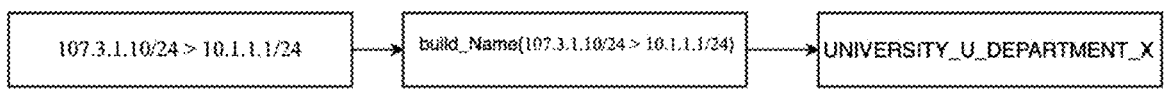

FIG. 27 illustrates a sample approaches to map IPs to human friendly version or hide IP from users for security or simplicity reasons, according to various aspects of the present disclosure; With reference to FIG. 26, the IP information are stored in database to be used by Profile manager to handle IP profiles. The profiles would be listed as human friendly names for example instead of showing (107.3.1.10/24>10.1.1.1/24) as profile name UNIVERSITY_U_DEPARTMENT_X is used as name for this profile. The names are built using function "Build_name ( )". The name builder might use different information including related IP information to build appropriate name describing the profile or using random names to name profiles. Multiple name builder might be used for different set of profiles. Name builder may dynamically change the name based on situation. To generate hash ids, some embodiments may use multiple hash functions or different profiles. The hash id corresponding to each profile might dynamically change by time.

II. Method of Authorization into Profiles Based on Related Standardized Identification Associated with Product The method of authorization into profiles based on related standardized identification associated with products is described below. Most of Products including but not limited to hardware, software, food, clothes and any other item you may buy from store provided with some kind of public product IDs. For example, usually you may find a barcode on product representing the product ID. However, product ID may be hacked on hardware as simple number or text.

Figure 28:
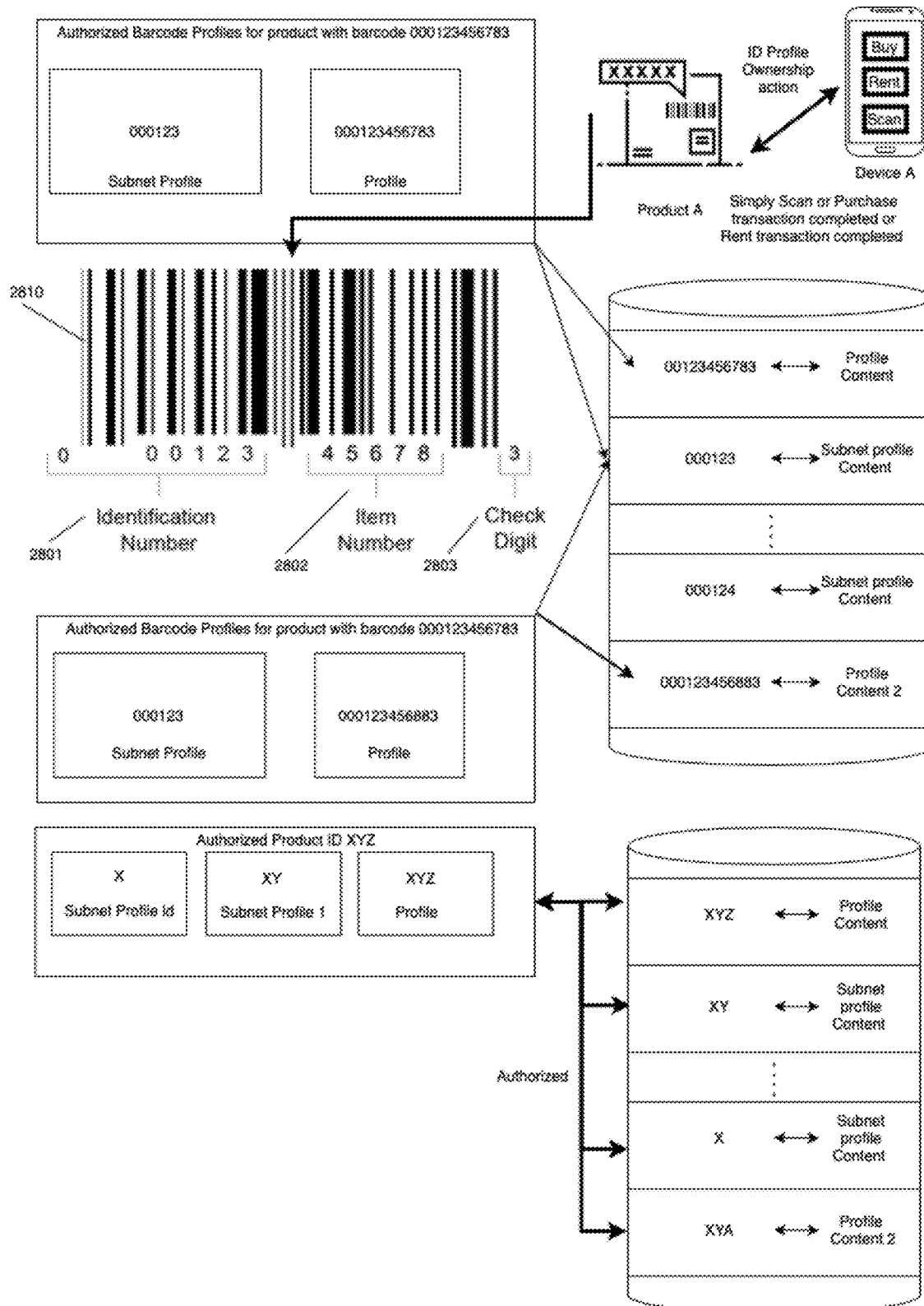
FIG. 28 illustrate an example for a method of authorization into profiles based on related standardized public identification associated with products, according to various aspects of the present disclosure.

FIG. 28 illustrate an example for a method of authorization into profiles based on related standardized public identification associated with products, according to various aspects of the present disclosure; The example of FIG. 28 shows how a standardized product identification such as a barcode may be used to provide access to hierarchy of profiles based on the barcode value. A barcode 2810 may be used for representing different entities according to a standard. A barcode may include multiple sections 2801-2802 to describe a specific product. For example, the identification number 2801 may represent an organization identification, the item number 2802 may represent a product in that organization, and the check digit 2803 may be used to make sure a barcode reader may correctly read the barcode and the barcode is a valid barcode.

With reference to FIG. 28 The present embodiments once at least one of profile ownership event completed for this barcode, some embodiments may authorize the access to three profiles associated with this ID automatically may authorize the access to two profiles associated with this barcode, organization identification subnet profile, the item number profile. This example may provide group nature features like chatroom, forum, or thread for organization identification profile and provide page nature features including but not limited to profile pages, profile pictures, profile setting, bio description and etc.

With reference to FIG. 28 the product ID profile ownership event may be purchasing transaction, product rental transaction or even simply scanning the barcode on product. Each event may authorize access to same or different product ID profile. For example, some embodiments may have a separate view (different user interface with different features) for owner of product which is authorized by purchase event and for scanner who simply scanned the barcode on product directly. Some embodiments may define ownership to the product ID scanner's profile as the last person who scanned the barcode.

With reference to FIG. 28 Standardized product identification numbers (IDs) may be in different format based on category of product, but they are usually made of multiple sections so that each section may narrow down from global identification number into specific item from specific product from specific brand. There might be multiple identification number representing the product in different standard.

With reference to FIG. 28 For example, the standardized product identification XYZ consist of three main sections. If the X part specifies the organization ID, Y part specifies the product ID and Z part specifies specific item of specific product. So, once at least one of profile ownership event completed for this ID, some embodiments may authorize the access to three profiles associated with this ID automatically. A group nature (subnet) profile for X, another group nature (subnet) profile for XY and finally a profile page for XYZ. Each profile may have different functionality. Some standardized unique identifications may have fewer or more sections, but this does not change the process.

With reference to FIG. 28, for example, the standardized hierarchical identification XYZ described above may be created by the profile manager as a virtual standardized hierarchical identification and assigned to the entities base on specific logic including, but not limited to, location, affiliations, gender, mutual interest, favorite movies or virtual assets, etc. The profile manager may use the generated virtual standardized hierarchical identification for authorizations and content management in authorized profiles as described using present invention. The generated network may be used as a communication and social networking embodiment among the entities with that virtual standardized hierarchical identification. Profile ownership event (as described for standardized product identification) for the virtual standardized hierarchical identification may be defined in a desire way. The virtual standardized hierarchical identification may be generated similar to IP structure but assigned in a customized way, so a completely different network with customized characteristic may be built using this method.

Figure 29:
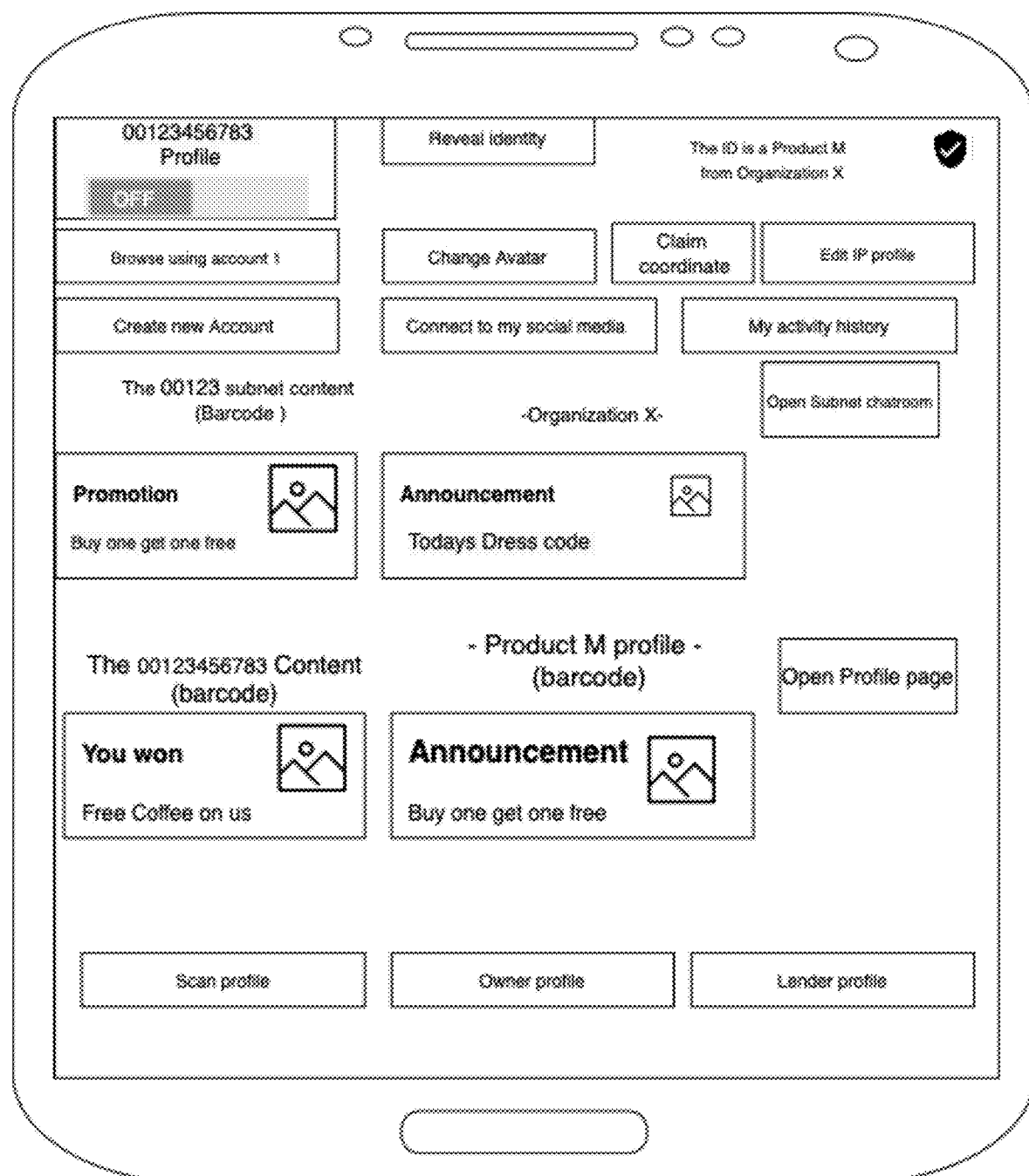
FIG. 29 is a schematic front view of a computing device that may include an application program for sample product identification profile after a device is authorized automatically once at least one of profile ownership event completed based on FIG. 28, according to various aspects of the present disclosure.

FIG. 29 is a schematic front view of a computing device that may include an application program for sample product identification profile after a device is authorized automatically, once at least one of profile ownership event completed based on FIG. 28, according to various aspects of the present disclosure; All authorized ID/Organization Subnet profiles on device A is shown in sample user interface in diagram. Each Profile may list some content including but not limited to promotions, announcements, map and etc. This content may be listed through the ID profile manager based on the value of the ID, the consisting section values and the standard applied to ID sections. With reference to FIG. 29, since multiple item number exist with same organization identification number, so, they may be treated as groups or rooms, so group nature features including but not limited to chatrooms and forum, may be defined for these profiles. For example, in the diagram the user of device A may open chatroom with all devices authorized with barcodes with same organization number in them. In other hand, the item number profile is more associated with more individual nature features like a page (ID Profile page). The social media features may be defined for all devices inside same organization subnet profiles.

With reference to FIG. 29, The user of the device may manage the ID profile belong to their ID as long as it is still owner of ID (based on ownership event), for example, for scanning ownership event, once someone else may the ID on product the product profile ownership passed to the new scanner, so the previous owner cannot manage or do activity as ID profile owner anymore unless she may the barcode again. In the case of purchase ownership event, the profile owner passed to the buyer once transaction in completed or ownership is verified in alternative ways. Similarly, for rent ownership event, some embodiments may pass the ownership to new lender.

With reference to FIG. 29, By default IP profile may be offline and the user decide to go Online and be visible to other devices in specific or all group nature ID profiles. Also, by default the user of the ID profile might be anonymous and unknown or it is known but the user decides to stay anonymous while using the ID profile. However, the user might decide to reveal their identity whenever they desire. As shown in the sample user interface, the ID profile might be populated with more user-friendly information from ID mete data, the Internet data about the product or any third-party entity involved in ID assignment. For example, some embodiments may recognize that ID is a product of Organization X.

With reference to FIG. 29, the user of the ID profile may connect their profile with any third-party account as long as they have access to that profile. For example, they may connect any of their social media or affiliated accounts so that their activities would have traces of their social media in them. For example, when using their social media X account to add some announcement to the ID profile page, it may show a link to their social media profile on top of the announcement. Or the user may change ID profile picture or avatar to their desired personal or non-personal one. The user may save these setups as accounts. For example, they might define an account with no identity and just an select an avatar for profile picture and another account connected to their university verified email and another one connected to the social media X. The user may use any of previous account or create new one while they are online in ID profile. In this case, for example as shown in FIG. 29 in more details, other devices may view the device in different way base on the account that is used by user while using the ID profile. To access these accounts, some embodiments may have a database and a verification method like account ID and pin or password similar to regular online accounts, However, having these accounts are optional and user may always setup their desire way through the ID profile as long as they are still holder of the ID.

Figure 30:
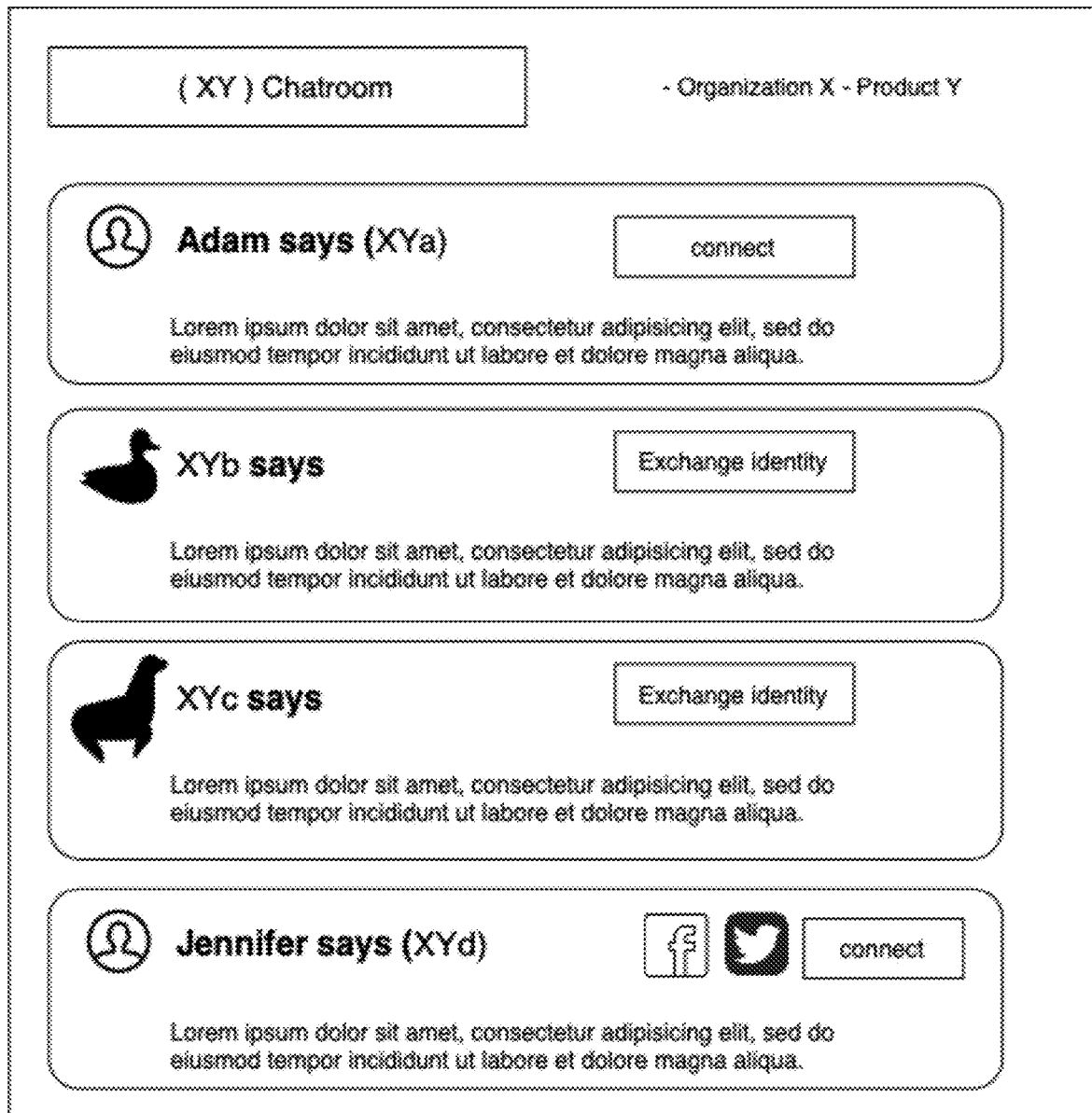
FIG. 30 is a schematic front view of a computing device that may include an application program for sample group chatroom for authorized devices with hierarchical standardized product Identification to communicate and possible exchange identities, according to various aspects of the present disclosure.

FIG. 30 is a schematic front view of a computing device that may include an application program for sample group chatroom for authorized devices with hierarchical standardized product Identification to communicate and possibly exchange identities, according to various aspects of the present disclosure; FIG. 30 illustrates a sample user interface of a chatroom as a group nature feature example for an organization subnet profile (XY) from XYZ product identification number point of view, with reference to FIG. 28. There are 4 devices online (different IDs) in this organization subnet profile. Two devices already revealed their identity and the last one connected her social media to her profile. Two other messages sent in anonymous (default) mode with different avatar or pictures setup as their profile picture. The XY profile is populated with information about the product identification ID, for example, the XY profile is about all those authorized with a product ID of product Y from organization X.

With reference to FIG. 30, Adam is authorized with product id of XYa and Jennifer with XYd. There are two other product ID profile associated with XYb and XYc are online in anonymous mode, With reference to FIG. 30, Adam or Jenifer may decide to send some message without using an identified account in any given time by changing or disconnecting it from their ID profile data or simply change their account to anonymous if they are using saved accounts. Any device in the organization ID subnet might request for identity exchange or going public for all if an account is anonymous or specific identity is not provided. In the other hand those in anonymous mode might decide to reveal their identity to specific identified device or stay anonymous from others. The exchange might happen in one-way or two-way mechanism. The two-way identity exchange simultaneously is shown in FIG. 14 and it may be done only if both sides has the identity verified beforehand.

III. Method of Authorization into Profiles Based on Related Geolocation Coordination Associated with A geographic coordinate system (GCS) is a coordinate system associated with positions on Earth (geographic position). In geodetic coordinates and map coordinates, the coordinate tuple is decomposed such that one of the numbers represents a vertical position and two of the numbers represent a horizontal position. For example (37.287319, −121.947231) is position on earth.

The shortest distance (the geodesic) between two given points P1=(lat1, lon1) and P2=(lat2, lon2) on the surface of a sphere with radius R is the great circle distance. It may be calculated using the formula:

$$dist=arccos(sin(lat_1)\cdot sin(lat_2)+cos(lat_1)\cdot cos(lat_2)\cdot cos(lon_1-lon_2))\cdot R$$

Suppose places within a distance R=1000 km from M=(lat, lon)=(X rad, Y rad) are to be found. The formula is something similar to below:

$$acos(sin(X)*sin(Lat)+cos(X)*cos(Lat)*cos(Lon-(Y)))*6371<=R$$

Figure 31:
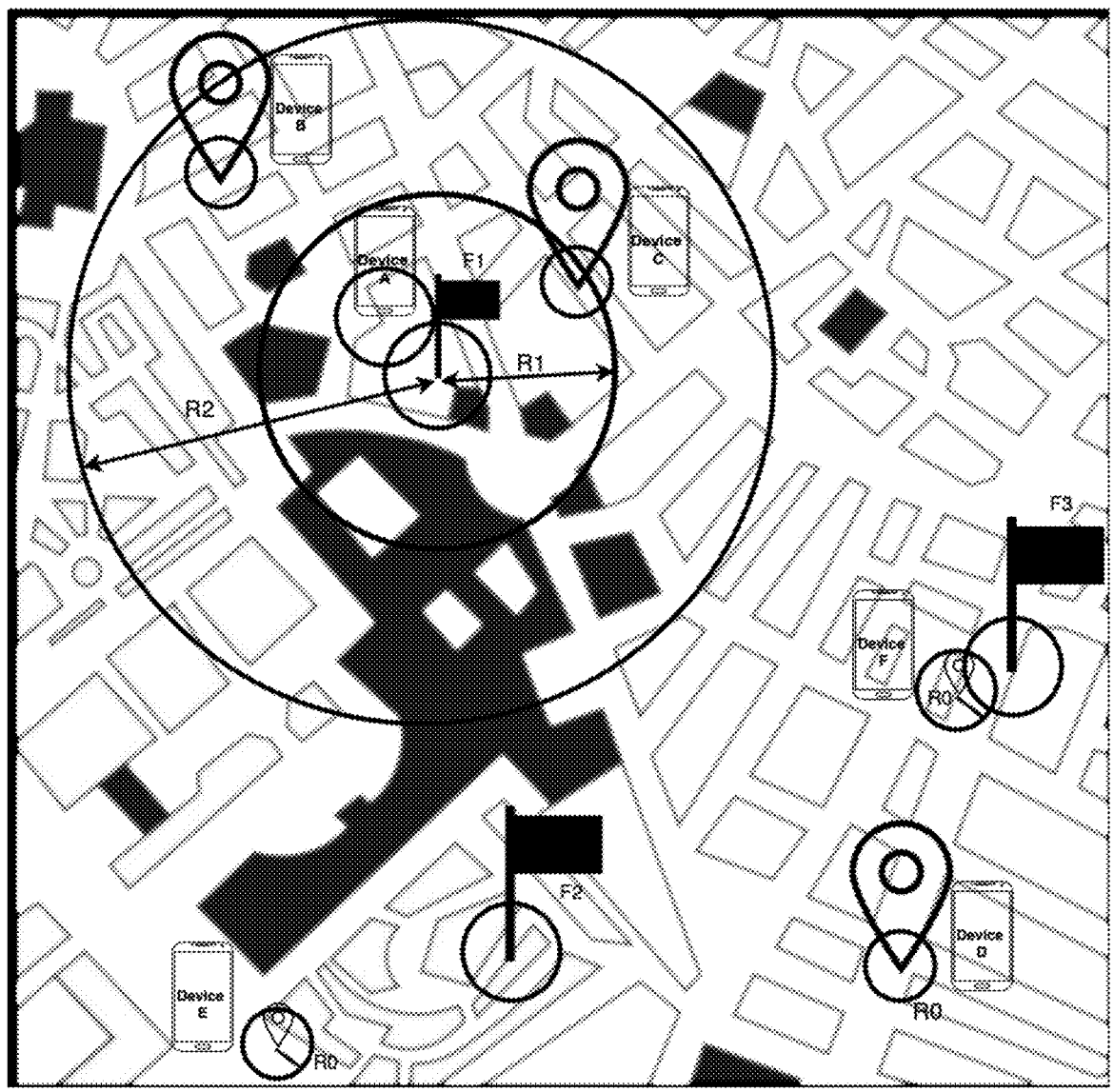
FIG. 31 illustrate an example for method of authorization into profiles based on related geolocation data associated with device, according to various aspects of the present disclosure.

When places are found within a distance from the coordinate, a circle with radios R ground may be assumed, as shown in FIG. 31.

FIG. 31 illustrate an example for method of authorization into profiles based on related geolocation coordination associated with device, according to various aspects of the present disclosure; With reference to FIG. 31, The example of FIG. 31 shows how device A in specific geodetic coordinates may be used to provide access to hierarchy of profiles based on the coordinate value.

With reference to FIG. 31, some embodiments may define profile R0 as the coordinate profile which is circle with the minimum radios around a given coordinate. Then R1 profile is circle with the second minimum radios (r=R1) around to given coordinates and so on, until The Rn profile which is circle with the biggest radios (r=Rn) around the given coordinates. For this example, let's assume only three level of profiles. R0 profile, R1 profile and R2 profile.

With reference to FIG. 31, some embodiments may define set of Flagged coordinates. These coordinates are coordinate profiles with only one owner in given time and the ownership passed to other devices at time of coordinate profile ownership entrance event. For example, some embodiments may define coordinate profile ownership entrance event as the newest device entered into the R0 vicinity of a flagged coordinate. However, the event may be defined differently. So, the device may manage and add content to the coordinate profile as long as she is still the last person entered into the R0 vicinity of a flagged coordinate. R1 and R2 profiles are profiles with group nature features. So, all device in R1 vicinity of flagged coordinate have access to R1 profile of a flagged coordinate. Similarly, for R2 profile of flagged coordinate. Since R2 vicinity has bigger radios than R1 it covers more area and probably more device in it but in longer distances.

With reference to FIG. 31, Flagged coordinate are a set of coordinates with associated coordinate profiles and may be selected in different strategy, some embodiments may choose them in random, specific coordinate so that the R0 vicinity of all selected coordinates cover all areas. The flagged coordinate may be requested by organization or person for desired coordinate.

With reference to FIG. 31, some embodiments may define a minimum distance between flagged coordinates, and may set the minimum to R0 too. This avoid having many profiles too close together.

With reference to FIG. 31, "Device A" is currently owner of coordinate profile F1 because it is the only device in R0 vicinity of Flagged coordinate F1. So "Device A" is currently authorized to manage and add content to F1 coordinate profile and use page features of R0 profile. "Device A" along with "Device C" both are in R1 vicinity of Flagged coordinate F1 so they may use group nature features defined for R1 profile. "Device B" is not authorized in Flagged coordinate R1 profile because it is not in R1 vicinity of F1, so it is not part of R1 profile of F1 coordinate. Device "Device A" along with "Device B" and "Device C" all are in R2 vicinity of Flagged coordinate F1 so they may use group nature features defined for R2 profile. So "Device C" screen the F1 coordinate's R1 and R2 profile are listed as authorized profiles not the F1 coordinate profile page itself (R0 profile of F1). And with same logic "Device B" screen include only R. If "Device C" go closer to coordinate F1, once it enters the R0 vicinity of F1, then "Device C" would be last device entered F1's R0 vicinity and the ownership of the F1 coordinate profile page will be passed to "Device C" and from that moment "Device A" can't manage the F1 coordinate profile page anymore.

With reference to FIG. 31, "Device F" is the in R0 vicinity of F3 so she is the owner of F3 coordinate profile page (R0 profile of F3) and currently managing it. the "Device E" is not authorized to any coordinate profile at this moment. If "Device E" go closer to coordinate F3, once it enters the R0 vicinity of F3, it takes the ownership of F3 coordinate profile page (R0 profile of F3)

Some embodiments may use alternative "profile ownership event" to pass ownership to next qualified Device. For example, some embodiments may give specific time limit to each device in first come first serve order before passing the ownership to the next, when multiple devices entered the R0 vicinity of specific flagged coordinate.

Figure 32:
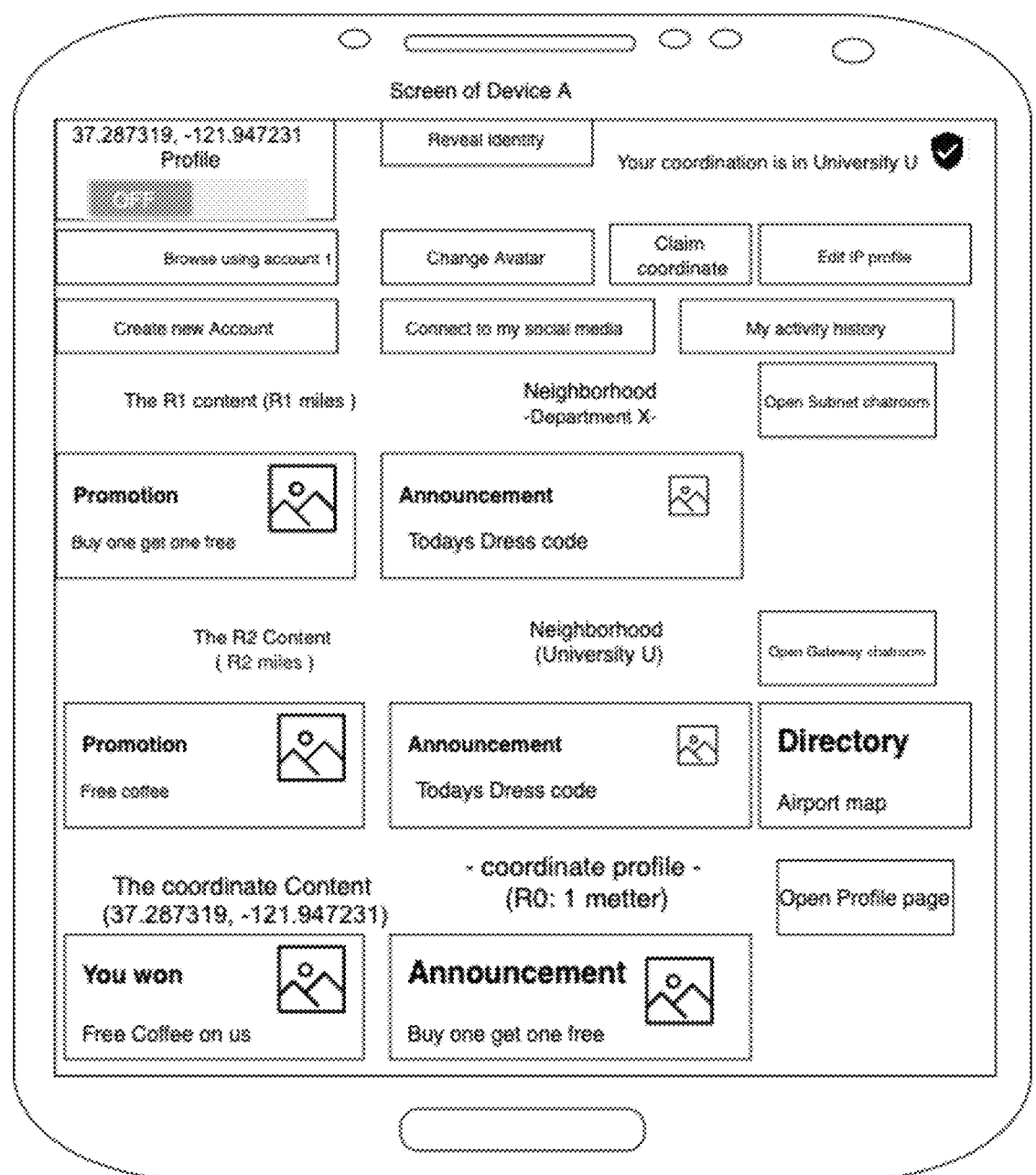
FIG. 32 is a schematic front view of a computing device that may include an application program for sample geolocation coordinate profile after a device is authorized automatically once at least one of profile ownership event completed based on FIG. 30, according to various aspects of the present disclosure

FIG. 32 is a schematic front view of a computing device that may include an application program for sample geolocation coordinate profile after a device is authorized automatically, once at least one of profile ownership event completed based on FIG. 31, according to various aspects of the present disclosure; All authorized Rn coordinate profiles on device A is shown in sample user interface in diagram. Each Profile may list some content including but not limited to promotions, announcements, map and etc. This content may be listed through the Coordinate Profile Manager based on the current coordination of device, the values corresponding to each Ri and the standard applied to coordinate profile ownership event. With reference to FIG. 32, since multiple devices may exist within each R1 or R2 coordinate profile, so, they may be treated as groups or rooms, so group nature features including but not limited to chatrooms and forum, may be defined for these profiles. For example, in the diagram the user of device A may open chatroom with all devices authorized within R2 vicinity of coordinate F1, in them. In other hand, the R0 profile is more associated with more individual nature features like a page (coordinate profile page). The social media features may be defined for all devices inside same Rk (k>0) coordinate profiles.

With reference to FIG. 32, The user of the device may manage the F coordinate profile page as long as it is still owner of coordinate profile and in R0 vicinity of F (based on ownership event), for example, for "last entered ownership event", once someone else entered the R0 vicinity of F, the F coordinate profile ownership will be passed to the newly entered device, so the previous owner cannot manage the profile anymore unless she exit the R0 vicinity and come back later again. Some embodiments may define a minimum time period between reclaiming the same profile.

With reference to FIG. 32, By default coordinate profile may be offline and the user decide to go Online and be visible to other devices in specific or all group nature Rk profiles (k>0 in example setup). Also, by default the user of the flagged coordinate profile might be anonymous and unknown or it is known but the user decides to stay anonymous while using the coordinate profile. However, the user might decide to reveal their identity whenever they desire. As shown in the sample user interface, the coordinate profile might be populated with more user-friendly information from coordinate mete data, the Internet data about the coordinate's location on earth or any third-party entity involved in coordinate assignment. For example, some embodiments may recognize that flagged coordinate is a specific building (Department X) or in specific neighborhood (University U) or specific store.

With reference to FIG. 32, the user of the coordinate profile may connect their profile with any third-party account as long as they have access to that profile. For example, they may connect any of their social media or affiliated accounts so that their activities would have traces of their social media in them. For example, when using their social media X account to add some announcement to the coordinate profile page, it may show a link to their social media profile on top of the announcement. Or the user may change coordinate profile picture or avatar to their desired personal or non-personal one. The user may save these setups as accounts. For example, they might define an account with no identity and just an select an avatar for profile picture and another account connected to their university verified email and another one connected to the social media X. The user may use any of previous account or create new one while they are online in a coordinate profile. Whit reference to FIG. 32 in more details, the device may be visible in different way from other devices view, based on the account that is used by user while using the coordinate profile. To access these accounts, some embodiments may have to have a database and a verification method like account ID and pin or password similar to regular online accounts, However, having these accounts are optional and user may always may setup their desire way through the coordinate profile as long as they are in R0 vicinity of a flagged coordinate.

The method of creating vicinity profiles as circles was described but for using coordinate and appropriate formula the vicinity may be defined in any shape or format, for example as squares.

Figure 33:
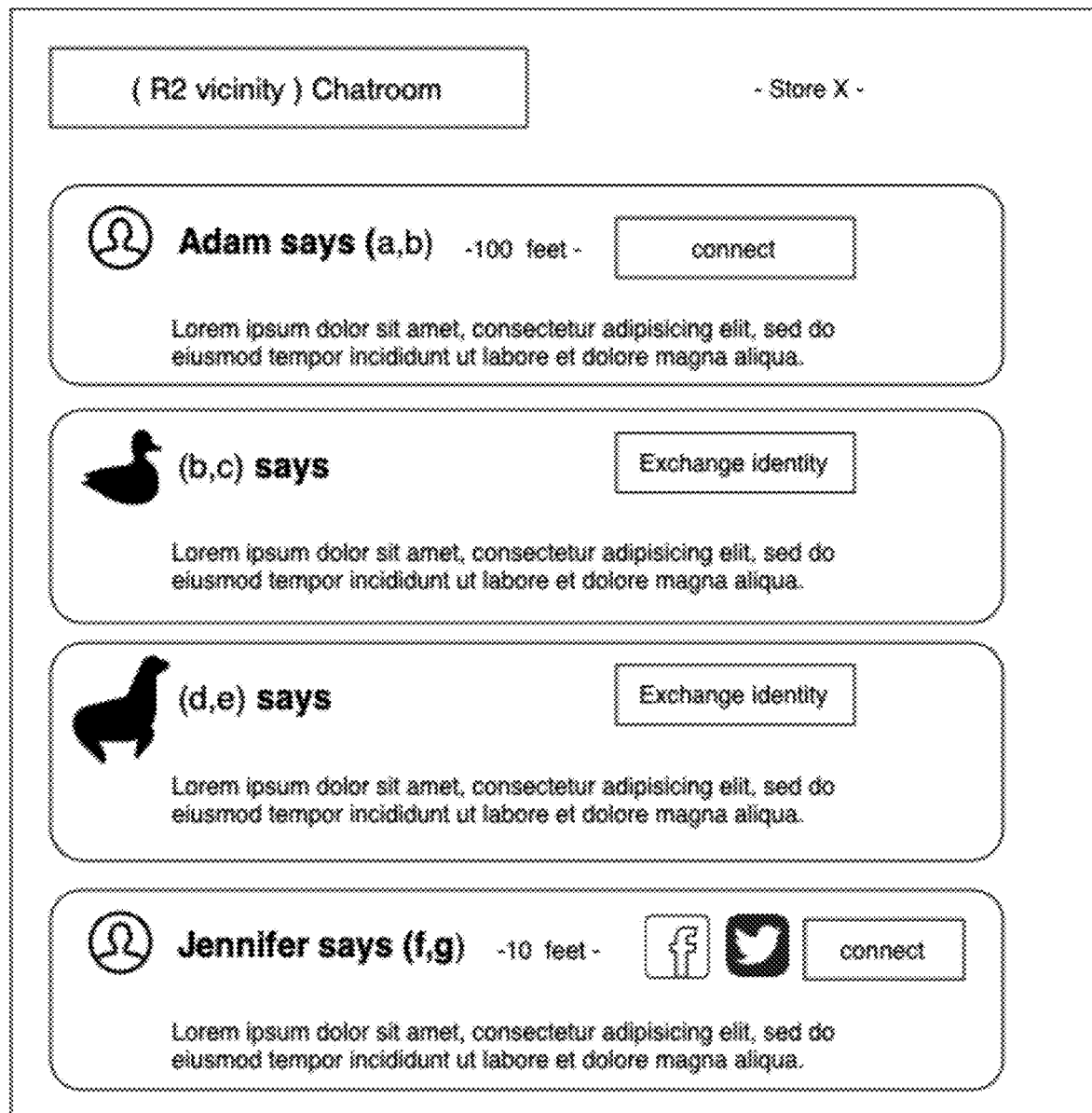
FIG. 33 is a schematic front view of a computing device that may include an application program for sample group chatroom for authorized devices with geolocation data associated with device to communicate and possible identities exchange, according to various aspects of the present disclosure.

FIG. 33 is a schematic front view of a computing device that may include an application program for sample group chatroom for authorized devices with geolocation data associated with device to communicate and possible identities exchange, according to various aspects of the present disclosure; FIG. 33 illustrates a sample user interface of a chatroom as a group nature feature example for a Ri (i>0 in described example setup) "coordinate profile".

with reference to FIG. 33. There are 4 devices online (different Device in Ri vicinity of F) in this Ri coordinate profile. Two devices already revealed their identity and the last one connected her social media to her profile. Two other messages sent in anonymous (default) mode with different avatar or pictures setup as their profile picture. The Ri coordinate profile for F is populated with information about the coordinate information, for example F is about to be the Store X in this example, this profile is about all those in less than Ri vicinity of Store X.

With reference to FIG. 33, Adam is authorized with coordinate value of (a, b) and Jennifer with (f,g). The two other devices authorized in coordinate profile associated with (b, c) and (d, e) are online in anonymous mode, The user may hide the coordinate from others. The distance from the viewer of the profile may be provided based on authorized device coordinates, for example Adam is 100 feet from this device.

With reference to FIG. 33, Adam or Jenifer may decide to send some message without using an identified account in any given time by changing or disconnecting it from their coordinate profile data or simply change their account to anonymous if they are using saved accounts. Any device in the Ri vicinity coordinate profile of F might request for identity exchange or going public for all if an account is anonymous or specific identity is not provided. In the other hand those in anonymous mode might decide to reveal their identity to specific identified device or stay anonymous from others. The exchange might happen in one-way or two-way mechanism. The two-way identity exchange simultaneously is shown in FIG. 14 and it may be done only if both sides has the identity verified beforehand.

Figure 34:
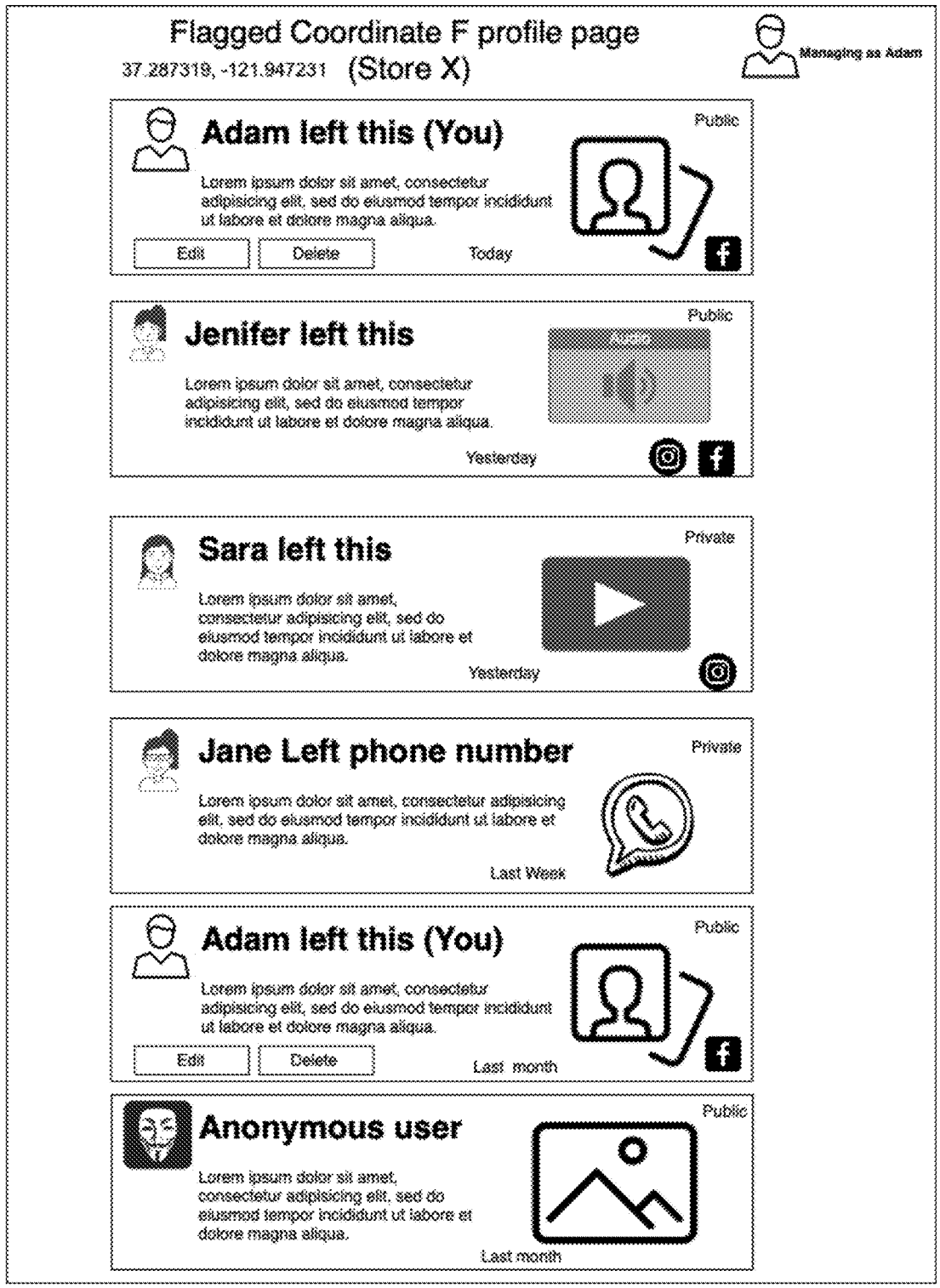
FIG. 34 is a schematic front view of a computing device that may include an application program for each coordinate profile illustrate temporary ownership of coordinate profile and passing ownership to different users when flagged coordinate is given to different users, according to various aspects of the present disclosure.

FIG. 34 is a schematic front view of a computing device that may include an application program for each coordinate profile illustrate temporary ownership of coordinate profile and passing ownership to different users when flagged coordinate is given to different users, according to various aspects of the present disclosure; With reference to FIG. 34, the coordinate profile content is added by previous owners by time. In the sample diagram, coordinate profile page for flagged coordinate F is shown at the time, the device holding this coordinate is online as Adam. Adam has left a message today and last month. In this example, the author of the content only may manage (edit, delete, etc.) their own content that appeared in the page. As shown in this example Adam previously was authorized as owner of F coordinate profile page last month and then Jane's device entered the R0 vicinity of coordinate F and ownership to this coordinate given to her so she could add content to the page. Jane chose to leave content privately or width restricted access so only future owner of the coordinate F or specific accounts in her cycle may view the content. Her device released the coordinate profile once it exited from R0 vicinity or someone else entered to R0 vicinity of coordinate, so it is signed out from the coordinate profile at some point, then the coordinate is given to Sara yesterday and Sara added her content to the page in private mode also. Sara probably exited from the R0 vicinity of coordinate F and entered another R0 vicinity of flagged coordinate (F2). So, Sara release her control over this F coordinate profile page, and gain access to F2 coordinate profile page so she may add content to her new F2 profile and not F. Then coordinate F is given to Jenifer right after Sara, so from that moment, she is the one who may add contents to the profile. Jenifer add her content in public mode so everyone may view her content (even those not authorized in the profile may peep on profiles) when peeping into the profile happens (e.g., Limited access view, Overview, Meta data only). So, some content inside the page might be hidden from some viewer and be visible to others, the author may choose who will be able to view her or his content, at the time she is adding content to the profile. As shown in the diagram the holder of coordinate profile may choose to add content anonymously. The coordinate profile page may be populated with information related to the coordinate from different sources. For example, corresponding location for coordinate F is Store X.

IV. Computer System

Figure 35:
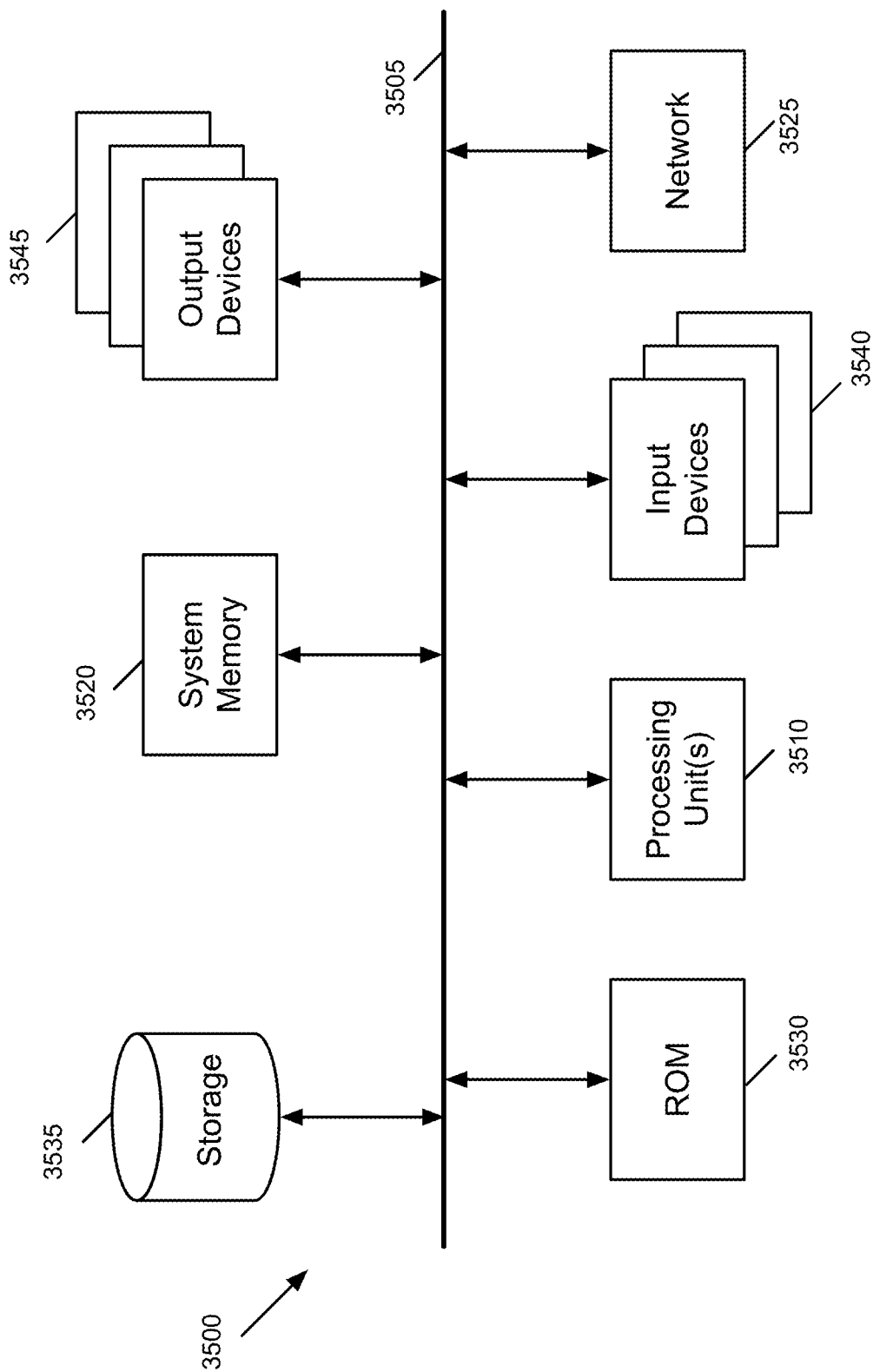
FIG. 35 is a functional block diagram illustrating an example electronic system, according to various aspects of the present disclosure.

FIG. 35 is a functional block diagram illustrating an example electronic system 3500, according to various aspects of the present disclosure. With reference to FIG. 35, some present embodiments, such as for example, and without limitations, the wave tag manager 100, the wave tag requesting device 155, the broadcasting device 158, the wave tag reader/capture device 140, the mobile devices, the servers, the computers, etc., described above, may be implemented using the electronic system 3500. The electronic system 3500 may be used to execute any of the processes, methods, controls, or operating system applications described above. The electronic system 3500 may be a computer (e.g., a desktop computer, laptop computer, a personal computer, a tablet computer, a server computer, a mainframe, a blade computer etc.), a phone (e.g., a smartphone), a personal digital assistant (PDA), or any other sort of electronic device. Such an electronic system may include various types of computer readable media and interfaces for various other types of computer readable media. The electronic system 3500 may include a bus 3505, processing unit(s) 3510, a system memory 3520, a read-only memory (ROM) 3530, a permanent storage device 3535, input devices 3540, and output devices 3545.

The bus 3505 may collectively represent all system, peripheral, and chipset buses that communicatively connect the numerous internal devices of the electronic system 3500. For example, the bus 3505 may communicatively connect the processing unit(s) 3510 with the read-only memory 3530, the system memory 3520, and the permanent storage device 3535.

From these various memory units, the processing unit(s) 3510 may retrieve instructions to execute and data to process in order to execute the processes of the present embodiments. The processing unit(s) may be a single processor or a multi-core processor in different embodiments.

The read-only-memory 3530 may store static data and instructions that are needed by the processing unit(s) 3510 and other modules of the electronic system. The permanent storage device 3535, on the other hand, may be a read-and-write memory device. This device is a non-volatile memory unit that may store instructions and data even when the electronic system 3500 is off. Some present embodiments may use a mass-storage device (such as a magnetic or optical disk and its corresponding disk drive) as the permanent storage device 3535.

Other embodiments may use a removable storage device (such as a floppy disk, flash drive, etc.) as the permanent storage device. Like the permanent storage device 3535, the system memory 3520 may be a read-and-write memory device. However, unlike storage device 3535, the system memory may be a volatile read-and-write memory, such as random access memory. The system memory may store some of the instructions and data that the processor needs at runtime. In some embodiments, the processes may be stored in the system memory 3520, the permanent storage device 3535, and/or the read-only memory 3530. From these various memory units, the processing unit(s) 3510 may retrieve instructions to execute and data to process in order to execute the processes of some embodiments.

The bus 3505 may also connect to the input and output devices 3540 and 3545. The input devices may enable the user to communicate information and select commands to the electronic system. The input devices 3540 may include alphanumeric keyboards and pointing devices (also called "cursor control devices"). The output devices 3545 may display images generated by the electronic system. The output devices may include printers and display devices, such as cathode ray tubes (CRT) or liquid crystal displays (LCD). Some embodiments may include devices such as a touchscreen that function as both input and output devices.

Finally, as shown in FIG. 35, the bus 3505 may also couple the electronic system 3500 to a network 3525 through a network adapter (not shown). In this manner, the computer may be a part of a network of computers (such as a local area network ("LAN"), a wide area network ("WAN"), an Intranet, or a network of networks, such as the Internet. Any or all components of the electronic system 3500 may be used in conjunction with the present embodiments.

Some embodiments may include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments may be performed by one or more integrated circuits, such as application specific integrated circuits (ASICs) or field programmable gate arrays (FPGAs). In some embodiments, such integrated circuits may execute instructions that are stored on the circuit itself. Some of the present embodiments may include flexible circuit, also rereferred to as flexible printed circuit boards (PCBs). The flexible circuits may provide dynamic flexing and increased heat dissipation and may be used in the embodiments that require circuits with smaller footprint, increased package density, more tolerance to vibrations, and/or less weight.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals or wired download.

What is claimed is:

1. A method of accessing and managing content in a network based on unique standardized hierarchal identifications, the method comprising:
    receiving a notification that a first electronic device has joined the network, the first electronic device associated with a first unique standardized hierarchal identification in a plurality of unique standardized hierarchal identifications, each unique standardized hierarchal identification comprising a plurality of hierarchal sections, each hierarchal section identifying a subsection in a plurality of hierarchal subsections of the network;
    assigning a first plurality of temporarily owned profiles to the first electronic device to access and manage content in the network, wherein each profile in the first plurality of temporarily owned profiles is associated with one hierarchal section in the plurality of hierarchal sections of the first unique standardized hierarchal identification of the first electronic device, wherein a temporarily owned profile associated with a lowest level in the first unique standardized hierarchal identification is associated with the first electronic device, wherein each profile associated with a hierarchical level other than the lowest hierarchical level is associated with a hierarchal subsection of the network, wherein a first temporarily owned profile in the plurality of temporarily owned profiles assigned to the first electronic device comprises a customized content added to the first temporarily owned profile by a previous temporary owner of the first temporarily owned profile, wherein the previous temporary owner of the first temporarily owned profile is not associated with the first electronic device;
    receiving a set of customized content from the first electronic device to add to the first temporarily owned profile;
    determining whether the first electronic device is authorized to append the set of customized content to the first temporarily owned profile;
    appending the set of customized content to the first temporarily owned profile in response to determining that the first electronic device is authorized to append the customized content to the first temporarily owned profile;
    at a display of the first electronic device, displaying hierarchal identifications of a plurality of profiles associated with a plurality of electronic devices other than the first electronic device, each electronic device in the plurality of electronic devices associated with a hierarchal identification comprising at least one hierarchal section common with a hierarchal section of the hierarchal identification of the first electronic device;
    receiving a set of one or more requests from the first electronic device to make the content in the first temporarily owned profile visible to a first subset of electronic devices in the plurality of electronic devices and invisible to a second subset of electronic devices in the plurality of electronic devices; and
    making the content in the first temporarily owned profile visible to the first subset of electronic devices and invisible to the second subset of electronic devices in response to the receiving the set of one or more requests from the first electronic device.

2. The method of claim 1, wherein the unique standardized hierarchal identifications comprise Internet Protocol (IP) addresses.

3. The method of claim 2, wherein the first unique standardized hierarchal identification is a first IP address, the method further comprising:
    determining that the first electronic device is no longer associated with the first IP address; and
    unassigning the plurality of temporarily owned profiles from the first electronic device.

4. The method of claim 2, wherein the plurality of temporarily owned profiles is a first plurality of temporarily owned profiles, wherein the first unique standardized hierarchal identification is a first IP address, the method further comprising:
    determining that the first electronic device is no longer associated with the first IP address and is associated with a second IP address, wherein the second IP address is different from the first IP address; and
    unassigning the first plurality of temporarily owned profiles from the first electronic device; and
    assigning a second plurality of temporarily owned profiles to the first electronic device, each profile in the second plurality of temporarily owned profiles associated with one hierarchal section in the plurality of hierarchal sections of the second IP address.

5. The method of claim 2 further comprising:
    filtering the hierarchal identifications of the plurality of profiles associated with the plurality of electronic devices based on a parameter; and
    at the display of the first electronic device, displaying the filtered hierarchal identifications of the plurality of profiles associated with the plurality of electronic devices.

6. The method of claim 5, wherein the parameter comprises one of a profile content, an IP holder, managing accounts, related public IP meta data, and geolocation data associated with the plurality of electronic devices.

7. The method of claim 1, wherein the unique standardized hierarchal identifications are standardized product identifications associated with products, wherein the first standardized hierarchal identification is a standardized product identification of a first product.

8. The method of claim 7 further comprising:
    determining that the first electronic device is no longer associated with the first product; and
    unassigning the first plurality of temporarily owned profiles from the first electronic device.

9. The method of claim 8, wherein the first product is associated with a barcode, wherein determining that the first electronic device is no longer associated with the first product comprises determining that a second electronic device has scanned the barcode associated with the first product.

10. The method of claim 7 wherein assigning the first plurality of temporarily owned profiles to the first electronic device comprises assigning the first plurality of temporarily owned profiles to the first electronic device in response to determining that the first product is purchased by a person associated with the first electronic device, the method further comprising:

assigning the first plurality of temporarily owned profiles to a second electronic device in response to determining that the person associated with the first electronic device has sold the first product to a person associated with the second electronic device.

11. The method of claim 7 wherein assigning the first plurality of temporarily owned profiles to the first electronic device comprises assigning the first plurality of temporarily owned profiles to the first electronic device in response to determining that first product is rented by a person associated with the first electronic device, and the method further comprising:

assigning the first plurality of temporarily owned profiles to a second electronic device in response to determining that the person associated with the second electronic device has rented the first product.

12. The method of claim 1, wherein the unique standardized hierarchal identifications are standardized product identifications associated with products, wherein the first standardized hierarchal identification is a standardized product identification of a first product or a first service, the method further comprising:

determining that the first electronic device is no longer associated with the first product or the first service;
unassigning the first plurality of temporarily owned profiles from the first electronic device; and
determining that the first electronic device is associated with a second product or a second service; and
assigning a second plurality of temporarily owned profiles to the first electronic device, each profile in the second plurality of temporarily owned profiles associated with one hierarchal section in the plurality of hierarchal sections of the second product or the second service.

13. The method of claim 1, wherein a particular profile in the first plurality of temporarily owned profiles is associated with a subnet of the network, the method further comprising:

defining a group comprising one of a chatroom and a forum for the particular profile, wherein the group is accessible to a plurality of electronic devices that are assigned the particular profile in their corresponding standardized hierarchal identifications.

14. The method of claim 1 further comprising:
connecting the first electronic device to a social media account associated with the first electronic device; and
adding content from the social media account associated with the first electronic device to a temporality owned profile in the first plurality of temporality owned profiles assigned to the first electronic device.

15. The method of claim 1 further comprising:
connecting the first electronic device to a third-party application associated with the first electronic device; and
adding content from the third-party application associated with the first electronic device to a temporality owned profile in the first plurality of temporality owned profiles assigned to the first electronic device.

16. The method of claim 1, wherein the set of one or more requests is a first set of one or more requests, the method further comprising:

receiving a second set of one or more requests from the first electronic device to make an identity of a person associated with the first electronic device visible to a third subset of electronic devices in the plurality of electronic devices and invisible to a fourth subset of electronic devices the plurality of electronic devices; and making the identity of the person visible to the third subset of electronic devices and invisible to the fourth subset of electronic devices in response to the receiving the second set of one or more requests from the first electronic device.

17. The method of claim 1 further comprising:
creating an account associated with a unique identity of the first electronic device; and
storing a plurality of activities and settings associated with the first electronic device in the account.

18. The method of claim 17, wherein the unique identity of the first electronic device comprises a media access control (MAC) address.

* * * * *